(12) United States Patent
Han

(10) Patent No.: US 11,637,495 B2
(45) Date of Patent: Apr. 25, 2023

(54) DC-DC CONVERTER WITH INDUCTOR SLEW

(71) Applicant: SAMSUNG DISPLAY CO., LTD., Yongin-si (KR)

(72) Inventor: Dong Kwan Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 184 days.

(21) Appl. No.: 17/060,288

(22) Filed: Oct. 1, 2020

(65) Prior Publication Data
US 2021/0281175 A1    Sep. 9, 2021

(30) Foreign Application Priority Data

Mar. 3, 2020    (KR) .................. 10-2020-0026695

(51) Int. Cl.
*H02M 1/08*    (2006.01)
*H02M 3/158*    (2006.01)
*G09G 3/3266*    (2016.01)
*H02M 1/00*    (2006.01)

(52) U.S. Cl.
CPC .......... *H02M 3/158* (2013.01); *G09G 3/3266* (2013.01); *H02M 1/08* (2013.01); *G09G 2320/0653* (2013.01); *H02M 1/0009* (2021.05); *H02M 1/0029* (2021.05)

(58) Field of Classification Search
CPC ...... H02M 3/158; H02M 1/08; H02M 1/0009; H02M 1/0029
See application file for complete search history.

(56) References Cited

U.S. PATENT DOCUMENTS

| 7,728,568 | B1 | 6/2010 | Jain |
| 7,808,299 | B2 | 10/2010 | Mao et al. |
| 9,501,969 | B2 | 11/2016 | Kwon et al. |
| 9,728,118 | B2 | 8/2017 | Park |
| 10,218,266 | B2 | 2/2019 | Park |
| 10,431,147 | B2 | 10/2019 | Park |

(Continued)

FOREIGN PATENT DOCUMENTS

| KR | 10-2016-0053124 | 5/2016 |
| KR | 10-1878175 | 7/2018 |

(Continued)

*Primary Examiner* — Jue Zhang
*Assistant Examiner* — Jye-June Lee
(74) *Attorney, Agent, or Firm* — F. Chau & Associates, LLC

(57) ABSTRACT

A voltage converter includes an input voltage line; an inductor coupled to the input voltage line; transistors coupled to the inductor; an output voltage line coupled to at least one of the transistors; a current sensor coupled to at least one of the input voltage line, the inductor, or the output voltage line; and a comparator coupled between the current sensor and the transistors. A DC-DC converter may include a voltage converter having an inductor and a plurality of transistors and configured to convert an input voltage into a power voltage and output the power voltage to an output terminal, an input current sensor configured to sense the input current of the converter, and a controller configured to change the slew rate of an inductor voltage in response to the input current of the converter and a preset reference current.

10 Claims, 16 Drawing Sheets

(56) References Cited

U.S. PATENT DOCUMENTS

| | | | |
|---|---|---|---|
| 2012/0062189 A1* | 3/2012 | Wang | H02M 3/156 323/271 |
| 2013/0234778 A1* | 9/2013 | Kuwabara | H02M 1/08 327/419 |
| 2014/0118413 A1* | 5/2014 | Park | H02M 3/158 345/82 |
| 2017/0019196 A1* | 1/2017 | Anniballi | G06F 21/32 |
| 2018/0131364 A1* | 5/2018 | Kaneda | H03K 17/08142 |
| 2019/0172379 A1* | 6/2019 | Park | H02M 3/158 |
| 2021/0258004 A1* | 8/2021 | Akiyama | H02M 1/08 |

FOREIGN PATENT DOCUMENTS

| | | |
|---|---|---|
| KR | 10-2018-0094206 | 8/2018 |
| KR | 10-2085061 | 3/2020 |

* cited by examiner

DC-DC CONVERTER WITH INDUCTOR SLEW

CROSS-REFERENCE TO RELATED APPLICATION

This application claims priority under 35 U.S.C. § 119 to Korean Patent Application No. 10-2020-0026695, filed in the Korean Intellectual Property Office on Mar. 3, 2020, the entire contents of which are incorporated by reference.

TECHNICAL FIELD

The present disclosure generally relates to DC-DC converters, and more particularly to a DC-DC converter with adjustable inductive voltage slew rate.

DISCUSSION OF RELATED ART

A display device, for example, may include a direct current to direct current (DC-DC) converter, which is configured to provide high-potential power and low-potential power required for driving pixels by converting input power supplied from the outside. For example, the DC-DC converter may supply generated positive-potential power and negative-potential power to the pixels through power lines. However, with an increase in the size of a display panel included in the display device or with an increase in the range of luminance that can be displayed, the range of a driving current supplied to the display panel may be increased. If a DC-DC converter designed to respond to a high driving current is used, but it is driven at low luminance with a low driving current, the conversion efficiency of the DC-DC converter may be reduced.

SUMMARY

A preferred embodiment of the present disclosure is directed to a DC-DC converter that may provide high conversion efficiency at both low luminance and high luminance without an increase in the number of passive elements, such as an inductor, or an increase in the area used by an active element, such as a transistor.

Embodiments of the present disclosure are not limited to the above-mentioned embodiment, and may be variously extended without departing from the spirit and scope of the present disclosure.

An embodiment of the present disclosure may provide for a DC-DC converter. The DC-DC converter may include a first converter having an inductor and a plurality of transistors and configured to convert an input voltage into a second power voltage and output the second power voltage to a first output terminal, an input current sensor configured to sense the input current of the first converter, and a controller configured to change the slew rate of an inductor voltage in response to the input current of the first converter and a preset reference current.

The slew rate of the inductor voltage may be the rate of change of the inductor voltage per unit time.

The controller may set the slew rate of the inductor voltage as a reference slew rate when the sensed input current of the first converter is higher than the reference current, and may change the slew rate of the inductor voltage to a slew rate higher than the reference slew rate when the input current of the first converter is lower than the reference current.

The first converter may include a first transistor coupled between an input terminal to which the input voltage is applied and a first node, a first inductor coupled between the first node and ground, and a second transistor coupled between the first node and the first output terminal.

The first converter may further include a plurality of first switch transistors coupled to the gate electrode of the first transistor in parallel, and a plurality of second switch transistors coupled to the gate electrode of the second transistor in parallel.

The controller may supply a first gate control signal to the gate electrode of the first transistor through one of the plurality of first switch transistors when the sensed input current of the first converter is higher than the reference current, and may supply the first gate control signal to the gate electrode of the first transistor through at least two of the plurality of first switch transistors when the sensed input current of the first converter is lower than the reference current.

The controller may supply a second gate control signal to the gate electrode of the second transistor through one of the plurality of second switch transistors when the sensed input current of the first converter is higher than the reference current, and may supply the second gate control signal to the gate electrode of the second transistor through at least two of the plurality of second switch transistors when the sensed input current of the first converter is lower than the reference current.

The controller may alternately turn on the first transistor and the second transistor.

The DC-DC converter may further include a second converter having an inductor and a plurality of transistors and configured to convert an input voltage into a first power voltage and output the first power voltage to a second output terminal.

The second converter may include a second inductor coupled between an input terminal to which the input voltage is applied and a second node, a third transistor coupled between the second node and ground, and a fourth transistor coupled between the second node and the second output terminal.

The first power voltage may be a positive voltage, and the second power voltage may be a negative voltage.

An embodiment of the present disclosure includes a DC-DC converter having: a converter with a plurality of inductors and a plurality of transistors coupled between an input terminal having an input voltage and an output terminal having an output voltage; an output sensor coupled to the output terminal; a mode selector having a switch configured to select any one of a single mode, in which a current flows through one of the plurality of inductors, or a dual mode, in which the current flows through at least two of the plurality of inductors; and a controller configured to change a reference current in response to an output voltage of the converter and to select any one of the single mode or the dual mode in response to at least one of the current or the reference current.

An embodiment of the present disclosure may provide for a DC-DC converter. The DC-DC converter may include a first converter having a plurality of inductors and a plurality of transistors and configured to convert an input voltage into a second power voltage and output the second power voltage to a first output terminal, an output current sensor configured to sense the output current of the first converter, a mode selector having a switch configured to select any one of a single mode, in which a current flows in only one of the plurality of inductors, and a dual mode, in which a current flows in all of the plurality of inductors, and a controller configured to change a reference current in response to the output voltage of the first converter and select any one of the single mode and the dual mode in response to the reference current and the output current of the first converter.

The controller may set the reference current higher as the output voltage of the first converter is higher.

The output voltage of the first converter may include first to fourth output voltages, and the controller may set a first reference current as the reference current when the output voltage of the first converter is the first output voltage, set a second reference current as the reference current when the output voltage of the first converter is the second output voltage, set a third reference current as the reference current when the output voltage of the first converter is the third output voltage, and set a fourth reference current as the reference current when the output voltage of the first converter is the fourth output voltage. When the first output voltage is lower than the second output voltage, when the second output voltage is lower than the third output voltage, and when the third output voltage is lower than the fourth output voltage, the first reference current may be lower than the second reference current, the second reference current may be lower than the third reference current, and the third reference current may be lower than the fourth reference current.

The controller may drive the first converter in the single mode when the output current of the first converter is lower than the reference current, and may drive the first converter in the dual mode when the output current of the first converter is higher than the reference current.

The first converter may include a first transistor coupled between an input terminal to which the input voltage is applied and a first node, a first inductor and a second inductor coupled between the first node and ground, and a second transistor coupled between the first node and the first output terminal.

The controller may couple any one inductor, selected from among the first inductor and the second inductor, between the first node and the ground when the output current of the first converter is lower than the reference current, and may couple the first and second inductors, which are coupled in parallel, between the first node and the ground when the output current of the first converter is higher than the reference current.

The DC-DC converter may further include an output voltage sensor configured to sense the output voltage of the first converter.

The DC-DC converter may further include a second converter having an inductor and a plurality of transistors and configured to convert an input voltage into a first power voltage and output the first power voltage to a second output terminal.

The second converter may include a third inductor coupled between an input terminal to which the input voltage is applied and a second node, a third transistor coupled between the second node and ground, and a fourth transistor coupled between the second node and the second output terminal.

The first power voltage may be a positive voltage, and the second power voltage may be a negative voltage.

An embodiment of the present disclosure includes a voltage converter having an input voltage line; at least one inductor coupled to the input voltage line; a plurality of transistors coupled to the at least one inductor; at least one output voltage line coupled to at least one of the plurality of transistors, respectively; at least one current sensor coupled to at least one of the input voltage line, the at least one inductor, or the output voltage line, respectively; and a comparator coupled between the at least one current sensor and the plurality of transistors.

The voltage converter may include a latched comparator that adjusts a voltage slew rate across the at least one inductor. The voltage converter may include a reference current source coupled to the comparator. The voltage converter may include a mode switch controllably coupled to the comparator and switchably coupled between the at least one inductor and another inductor disposed in parallel with the at least one inductor. The voltage converter may include control logic coupled between the comparator and the plurality of transistors that implements at least one of a continuous conduction mode (CCM), a discontinuous conduction mode (DCM), a pulse skip mode (PSM), or a pulse frequency modulation mode (PFM) based on the at least one current sensor.

The voltage converter may include at least one of the plurality of transistors disposed between the input voltage line and the output voltage line, and a plurality of switch transistors coupled in parallel to a gate electrode of the at least one of the plurality of transistors. The voltage converter may include at least two of the plurality of transistors, including a first transistor and a first sub-transistor, arranged in parallel between the input voltage line and the output voltage line.

The voltage converter may include the at least one inductor disposed between the input voltage line and the output voltage line. The voltage converter may include the at least one inductor disposed between the input voltage line and a ground.

The voltage converter may include at least one of the plurality of transistors disposed between the at least one inductor and at least one of the input voltage line or the output voltage line. The voltage converter may include at least one of the plurality of transistors disposed between the at least one inductor and the output voltage line. The voltage converter may include at least one of the plurality of transistors disposed between the at least one inductor and a ground.

DETAILED DESCRIPTION

Figure 1:
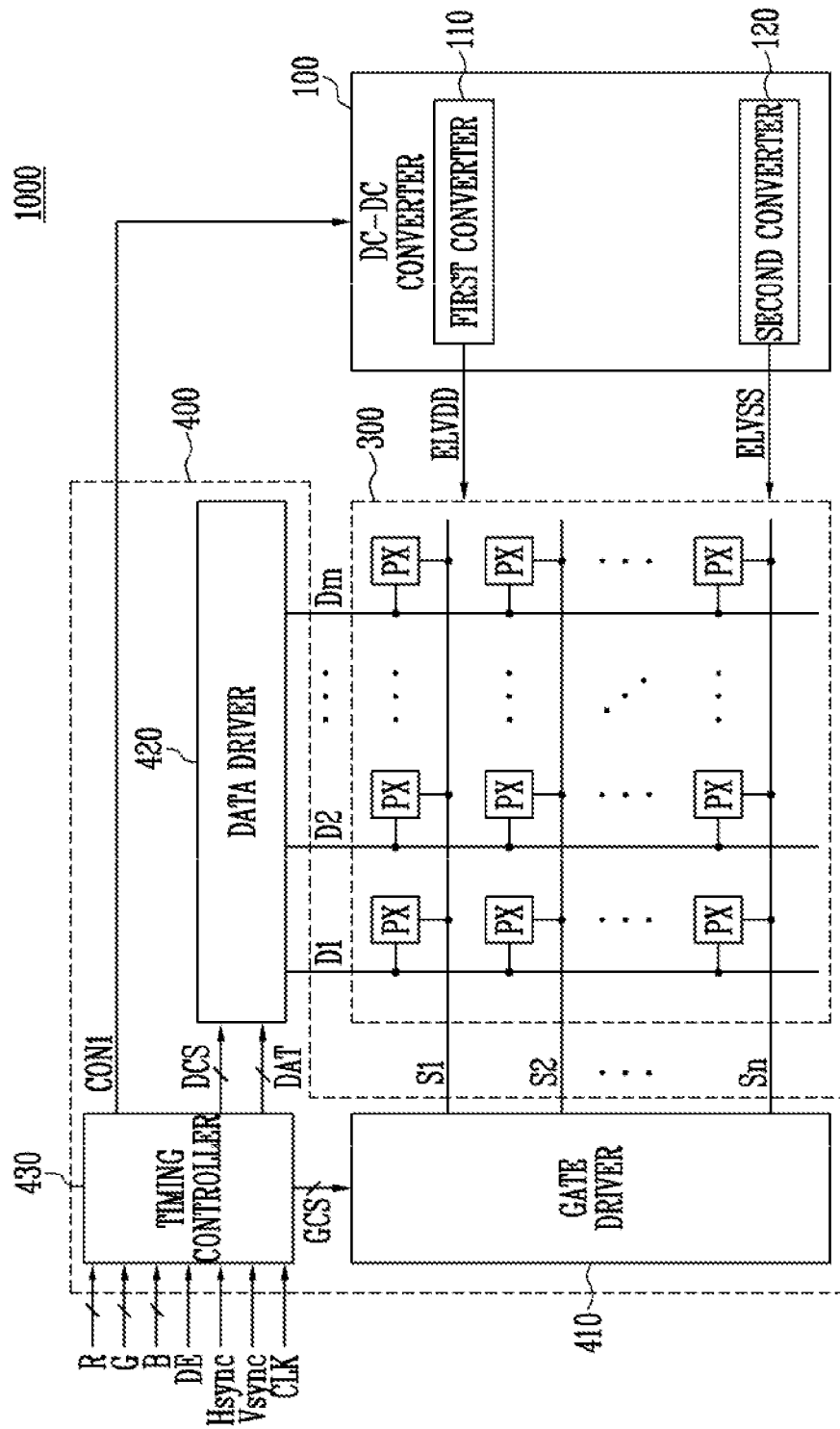
FIG. 1 is a schematic block diagram illustrating a display device according to an embodiment of the present disclosure.

Exemplary embodiments of the present disclosure, including devices and methods of operation, will be apparent from the following description to be considered with reference to the accompanying drawings. However, it should be noted that the present disclosure is not limited to the following exemplary embodiments, and may be implemented in various forms. Accordingly, the exemplary embodiments are provided to disclose the present disclosure by means of example to enable those skilled in the art to know the category, scope and sprit of the present disclosure, where the bounds of the present disclosure are to be defined based only on the appended claims.

The same or like reference numerals or designators may denote the same or like elements throughout the specification. Because shapes, sizes, ratios, angles, numbers, and the like illustrated in the accompanying drawings for describing exemplary embodiments of the present disclosure are merely exemplary, the present disclosure is not limited thereto.

Terms such as 'first' and 'second' may be used to describe various components, but they should not limit the various components. Those terms are used for the purpose of differentiating a component from other components. For example, a first component may be referred to as a second component, and a second component may be referred to as a first component and so forth without departing from the spirit and scope of the present disclosure.

The features of various embodiments of the present disclosure, such as nut not limited to first and second converters, first and second inductors, parallel transistors and/or multiple parallel switch transistors per gate electrode, can be partially or entirely bonded to or combined with each other and can be interlocked and operated in various technical ways, and the embodiments can be carried out independently of or in association with each other.

Hereinafter, specific embodiments will be described with reference to the accompanying drawings.

An embodiment of the present disclosure includes a DC-DC converter having: a voltage converter with an input voltage line, an inductor coupled to the input voltage line, a plurality of transistors coupled to the inductor, a power voltage line coupled to at least one of the plurality of transistors, and an output terminal coupled to the power voltage line; an input current sensor coupled to the input voltage line of the voltage converter; and a controller having a latched comparator with a reference current source coupled between the input current sensor and gates of the plurality of transistors.

FIG. 1 illustrates a display device according to an embodiment of the present disclosure.

Referring to FIG. 1, the display device 1000 may include a DC-DC converter 100, a display panel 300, and a driver 400. The driver 400 may include a gate driver 410, a data driver 420, and a timing controller 430.

The display panel 300 may include a plurality of pixels PX coupled to a plurality of gate lines S1, S2, . . . , Sn and a plurality of data lines D1, D2, . . . , Dm and arranged in the form of a matrix. Here, n and m are positive integers. Each of the plurality of pixels PX may operate by receiving a first power voltage ELVDD from the DC-DC converter 100, a second power voltage ELVSS from the DC-DC converter 100, a gate signal from the gate driver 410 via one of the plurality of gate lines S1, S2, . . . , Sn, and a data signal from the data driver 420 via one of the plurality of data lines D1, D2, . . . , Dm. In an embodiment, the second power voltage ELVSS may be lower than the first power voltage ELVDD. For example, the first power voltage ELVDD may be a positive voltage, and the second power voltage ELVSS may be a negative voltage, without limitation.

According to an embodiment of the present disclosure, when the display device 1000 is started, the display panel 300 may display a black image during a preset start period. During the start period, the black image is displayed, and the start of the DC-DC converter 100 may be stably initialized.

The timing controller 430 may receive RGB image signals R, G and B, a vertical synchronization signal Vsync, a horizontal synchronization signal Hsync, a main clock signal CLK, a data enable signal DE, and the like from an external graphics controller, and may generate output image data DAT corresponding to the RGB image signals R, G and B, a data control signal DCS, a gate control signal GCS, and a first control signal CON1 based on the received signals. The timing controller 430 may supply the gate control signal GCS to the gate driver 410, supply the output image data DAT and the data control signal DCS to the data driver 420, and supply the first control signal CON1 to the DC-DC converter 100. For example, the gate control signal GCS may include a vertical synchronization start signal for controlling the start of the output of a gate signal, a gate clock signal for controlling the output time of the gate signal, an output enable signal for controlling the duration of the gate signals, and the like. The data control signal DCS may include a horizontal synchronization start signal for controlling the start of the input of a data signal, a load signal for applying the data signal to the data lines D1, D2, . . . , Dm, a data clock signal for controlling the output time of the data signal, and the like. The first control signal CON1 may be a signal for controlling the start of driving of the DC-DC converter 100.

The gate driver 410 may sequentially apply a gate signal to the gate lines S1, S2, . . . , Sn of the display panel 300 based on the gate control signal GCS supplied from the timing controller 430.

The data driver 420 may apply a data signal to the data lines D1, D2, . . . , Dm based on the data control signal DCS and the output image data DAT supplied from the timing controller 430.

The DC-DC converter 100 may include a first converter 110 configured to output the first power voltage ELVDD to a first output terminal by converting input power in response to the control signal CON1 and a second converter 120 configured to output the second power voltage ELVSS to a second output terminal by converting the input power.

Figure 3:
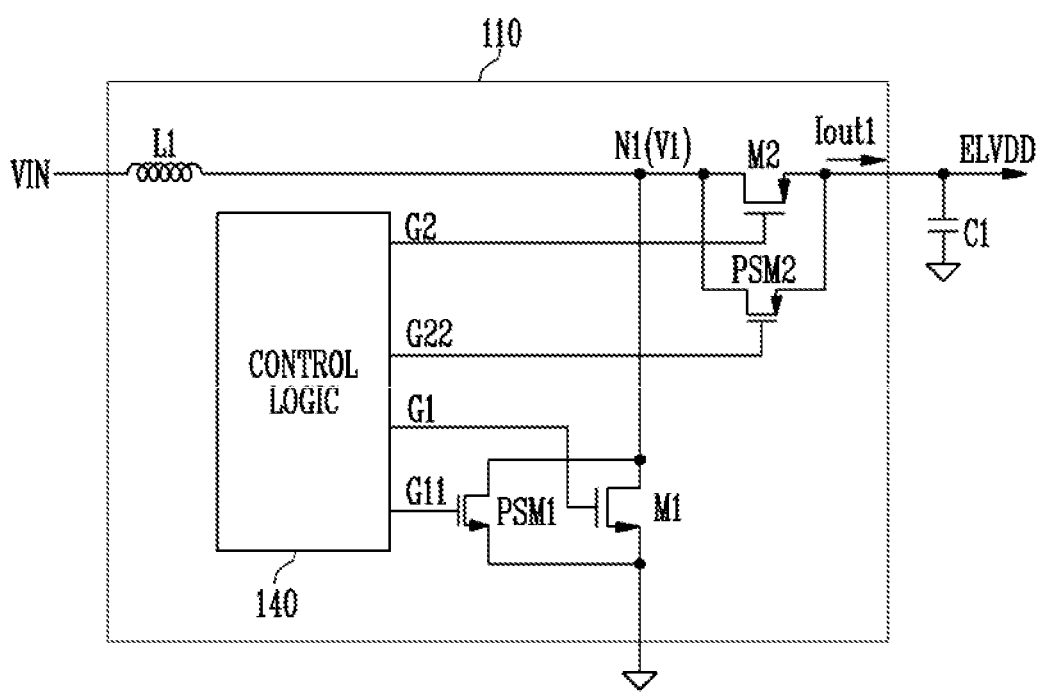
FIG. 3 is a hybrid schematic diagram illustrating an example of the first converter included in the DC-DC converter of FIG. 1.

Referring out of sequence to an exemplary embodiment of FIG. 3, although not limited thereto, the first converter 110 may include a first inductor coupled between the input power source and a first node, a first transistor coupled between the first node and the ground, and a second transistor coupled between the first node and an output terminal. In such an embodiment, the first converter 110 may output the first power voltage ELVDD by converting the input power using the first and second transistors.

For example, the first converter 110 may output the first power voltage ELVDD using a first driving method, which is configured to generate a first inductor current by alternately turning on the plurality of transistors, in a normal mode. In an embodiment, the first driving method may be a driving method in which a magnitude of the first inductor current continuously changes based on a first Pulse Width Modulation (PWM) signal of a first driving frequency. For example, the first driving method may be a continuous conduction mode (CCM) method.

The first converter 110 may output the first power voltage ELVDD using a second driving method, which is configured to generate a first inductor current through a smaller number of turn-on events than the first driving method, in a power-saving mode. In an embodiment, the second driving method may include a first discontinuous period in which the magnitude of the first inductor current does not change based on the first PWM signal of a second driving frequency. For example, the second driving method may be a discontinuous conduction mode (DCM) method. Also, the second driving frequency may be equal to or lower than the first driving frequency.

In an embodiment, the first inductor current generated through the first driving method may have a first peak value, and the first inductor current generated through the second driving method may have a second peak value that is less than the first peak value.

In the power-saving mode, the period in which the magnitude of the first inductor current does not change may correspond to the period in which switching of the transistors included in the first converter 110 is stopped. In other words, the first discontinuous period may correspond to the period in which all of the transistors included in the first converter 110 are in a turn-off state.

That is, the first converter 110 may output the first power voltage ELVDD while continuously changing the magnitude of the first inductor current in the first driving method, and may output the first power voltage ELVDD while utilizing the period in which the magnitude of the first inductor current does not change in the second driving method. Accordingly, power consumption caused by switching may be reduced by adding the period in which the magnitude of the first inductor current does not change in the power-saving mode.

The second converter 120, which may be the same or different type as the first converter 110, without limitation, may output the second power voltage ELVSS using a third driving method in the power-saving mode. The third driving method may enable a second inductor current, which may be the current inside the second converter 120, to be generated with a smaller number of turn-on events than the second driving method. In an embodiment, the second converter 120 may output the second power voltage ELVSS using the third driving method that includes a second discontinuous period in which the magnitude of the second inductor current does not change based on a second PWM signal. The second discontinuous period may correspond to the period in which all of the transistors included in the second converter 120 are in a turn-off state. For example, the third driving method may be a pulse skip mode (PSM) method.

Alternatively, the third driving method may reduce the number of times the transistors are turned on, or the number of switching operations, by lowering a frequency using a Pulse Frequency Modulation (PFM) method. For example, the number of switching operations of the transistors included in the second converter 120 may be reduced by lowering the frequency of a signal for driving the transistors in the power-saving mode, and the magnitude of the absolute value of the second power voltage ELVSS may be decreased.

Here, the second discontinuous period may be longer than the first discontinuous period. Therefore, the number of times the transistors included in the second converter 120 are turned on, or the number of switching operations, in the third driving method may be much less than that in the second driving method. Accordingly, power consumption of the second converter 120 in any of the above-described power-saving modes may also be reduced.

In an embodiment, the second converter 120 may be driven by selecting one of the first to fourth driving methods depending on the magnitude of the load, such as, for example, light emission luminance of the display panel 300 in the normal mode. The second converter 120 may also adjust the magnitude of the second power voltage ELVSS depending on the first to fourth driving methods. For example, when the second power voltage ELVSS is a negative voltage, the second power voltage ELVSS output through the third driving method may be higher or less negative than the second power voltage ELVSS output through the first driving method. Accordingly, the potential difference between the first power voltage ELVDD and the second power voltage ELVSS in the power-saving mode may be less than the potential difference in the normal mode.

Figure 2:
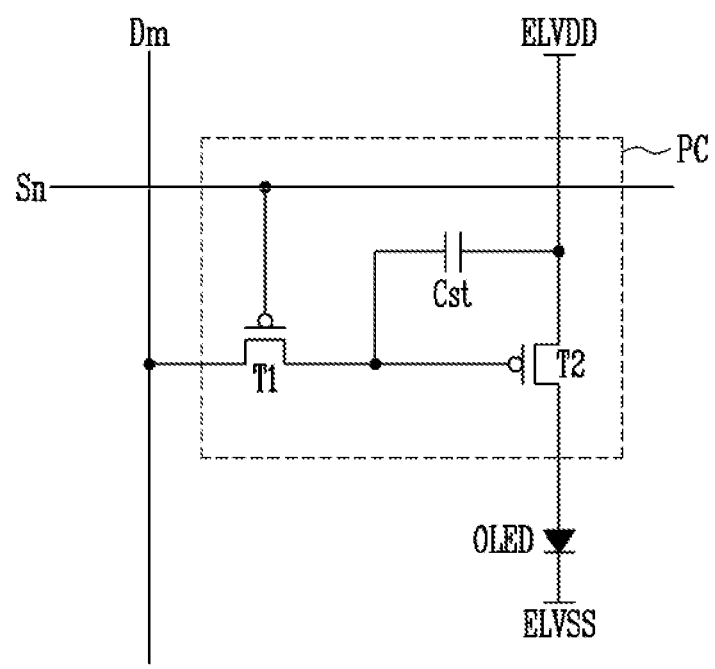
FIG. 2 is a schematic circuit diagram illustrating an embodiment of the pixel illustrated in FIG. 1.

FIG. 2 illustrates an embodiment of the pixel illustrated in FIG. 1. In particular, FIG. 2 illustrates the pixel coupled to the n-th scan line Sn and the m-th data line Dm for convenience of description, without limitation thereto.

Referring to FIG. 2, each pixel PX includes an organic light-emitting diode OLED and a pixel circuit PC for controlling the organic light-emitting diode OLED by being coupled to the data line Dm and the scan line Sn.

The anode electrode of the organic light-emitting diode OLED is coupled to the pixel circuit PC and the cathode electrode thereof is coupled to a second voltage source ELVSS.

The organic light-emitting diode OLED generates light with predetermined luminance in response to the current supplied from the pixel circuit PC.

The pixel circuit PC controls the amount of current supplied to the organic light-emitting diode OLED in response to the data signal supplied to the data line Dm when a scan signal is supplied to the scan line Sn. The pixel circuit PC includes a second transistor T2 coupled between a first voltage source ELVDD and the anode of the organic light-emitting diode OLED, a first transistor T1 coupled between the second transistor T2, the data line Dm, and the scan line Sn, and a storage capacitor Cst coupled between the gate electrode of the second transistor T2 and the first electrode of the second transistor T2.

The gate electrode of the first transistor T1 is coupled to the scan line Sn, and the first electrode thereof is coupled to the data line Dm.

Also, the second electrode of the first transistor T1 is coupled to a terminal on one side of the storage capacitor Cst at the gate electrode of the second transistor T2.

Here, the first electrode is set to any one of the source electrode or the drain electrode, and the second electrode is set to the electrode other than the first electrode. For example, when the first electrode is set to the source electrode, the second electrode is set to the drain electrode.

The first transistor T1, coupled to the scan line Sn and the data line Dm, is turned on when a scan signal is supplied from the scan line Sn, thereby supplying the data signal, supplied from the data line Dm, to the storage capacitor Cst. Here, the storage capacitor Cst is charged with the voltage corresponding to the data signal.

The gate electrode of the second transistor T2 is coupled to a terminal on one side of the storage capacitor Cst, and the first electrode thereof is coupled to a terminal on the other side of the storage capacitor Cst and to the first voltage source ELVDD. Also, the second electrode of the second transistor T2 is coupled to the anode electrode of the organic light-emitting diode OLED.

The second transistor T2 controls the amount of current flowing from the first voltage source ELVDD to the second voltage source ELVSS via the organic light-emitting diode OLED in response to the voltage value stored in the storage capacitor Cst. Here, the organic light-emitting diode OLED generates light corresponding to the amount of the current supplied from the second transistor T2.

The above-described pixel structure of FIG. 2 is an embodiment of the present disclosure, and the pixel PX of the present disclosure is not limited thereto. The pixel circuit PC has a circuit structure capable of supplying a current to the organic light-emitting diode OLED, and any one of various structures that are currently known may be selected therefor.

Figure 4:
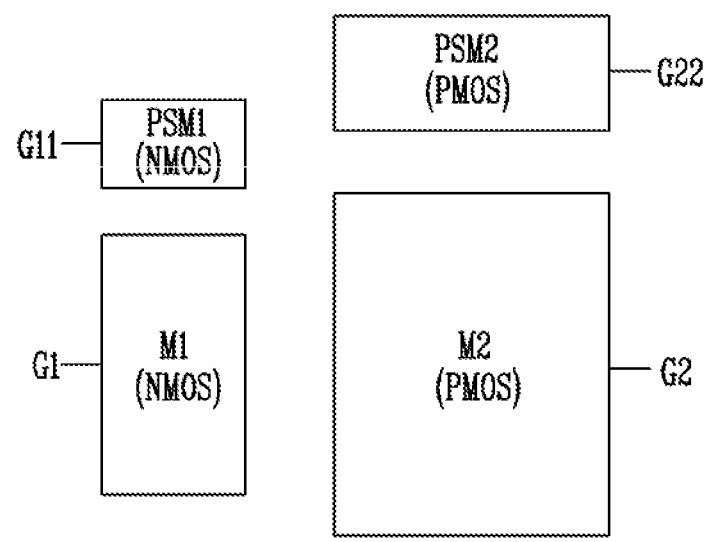
FIG. 4 is a comparative block diagram briefly illustrating an example of the relative sizes of transistors included in the first converter of FIG. 3.

Returning now to FIG. 3, in order, FIG. 3 illustrates an example of the first converter included in the DC-DC converter of FIG. 1. FIG. 4 briefly illustrates an example of the relative sizes of the transistors that may be included in the first converter of FIG. 3.

Referring to FIG. 1 and FIG. 3, the first converter 110 may include a switch and a controller 140. The switch may include a first inductor L1, a first transistor M1, a first sub-transistor PSM1, a second transistor M2, and a second sub-transistor PSM2.

The first converter 110 converts input power VIN, thereby outputting a first power voltage ELVDD. For example, the first converter 110 may include a boost converter.

The first inductor L1 may be coupled between an input terminal to which the voltage of the input power VIN is applied and a first node N1. The first power voltage ELVDD may be controlled based on a first inductor current that flows through the first inductor L1.

The first transistor M1 may be coupled between the first node N1 and the ground. The first transistor M1 may be turned on by receiving a first control signal G1 from the controller 140, and may perform control such that a current flows through the first inductor L1.

The first sub-transistor PSM1 may be coupled to the first transistor M1 in parallel. The first sub-transistor PSM1 may be turned on by receiving a first sub-control signal G11 from the controller 140, and may perform control such that a current flows through the first inductor L1. The first sub-transistor PSM1 may perform the same operation as the first transistor M1.

The first sub-transistor PSM1 may have a smaller size than the first transistor M1. In this case, the rated current amount of the first sub-transistor PSM1 may be less than that of the first transistor M1. However, the size of the first sub-transistor PSM1 and the number of first sub-transistors PSM1 are not limited thereto. For example, the size of the first sub-transistor PSM1 may be increased or the same as the size of the first transistor M1, and/or the number of first sub-transistors PSM1 may be variously changed, such as to adjust the total rated current amount of the first sub-transistors when arranged in parallel.

The second transistor M2 may be coupled between the first node N1 and a first output terminal to which the first power voltage ELVDD is output. In a normal mode, the second transistor M2 may be turned on alternately with the first transistor M1. Accordingly, the second transistor M2 may be turned on after electromotive force is generated in the first inductor L1 because the first transistor M1 is turned on, whereby the voltage V1 of the first node N1 may be converted into the first power voltage ELVDD. The second transistor M2 may be turned on by receiving a second control signal G2 from the controller 140.

The second sub-transistor PSM2 may be coupled to the second transistor M2 in parallel. The second sub-transistor PSM2 may be turned on by receiving a second sub-control signal G22 from the controller 140. The second sub-transistor PSM2 may be turned on alternately with the first sub-transistor PSM1. The second sub-transistor PSM2 may perform the same operation as the second transistor M2.

The second sub-transistor PSM2 may have a smaller size than the second transistor M2. However, the size of the second sub-transistor PSM2 and the number of second sub-transistors PSM2 are not limited thereto. For example, the size of the second sub-transistor PSM2 may be the same as the size of the second transistor M2, and/or the number of second sub-transistors PSM2 may be variously changed, such as to adjust the total rated current amount of the second sub-transistors when arranged in parallel.

According to an embodiment of the present disclosure, when a first output current Iout1 increases, all of the first transistor M1 and the first sub-transistor PSM1 may be driven to reduce resistive losses, and some or all of the second transistor M2 and/or the second sub-transistor PSM2 may also be driven. Here, the sizes of the first and second sub-transistors PSM1 and PSM2 may be the same as the sizes of the first and second transistors M1 and M2, respectively. For example, when the first output current Iout1 increases, the first transistor M1 may be turned on by the first control signal G1, and the first sub-transistor PSM1 may be turned on by the first sub-control signal G11. Also, the second transistor M2 may be turned off or on by the second control signal G2, and/or the second sub-transistor PSM2 may be turned off or on by the second sub-control signal G22.

Also, when the first output current Iout1 is low, the first sub-transistor PSM1 and the second sub-transistor PSM2 are set to a turn-off state, and the first transistor M1 and the second transistor M2 may be driven. For example, when the first output current Iout1 is low, the first transistor M1 may be turned on by the first control signal G1, and the first sub-transistor PSM1 may be turned off by the first sub-control signal G11. Also, the second transistor M2 may be turned on by the second control signal G2, and the second sub-transistor PSM2 may be turned off by the second sub-control signal G22.

According to another embodiment of the present disclosure, the first and second transistors M1 and M2 operate to perform switching operations in the normal mode, and the first and second sub-transistors PSM1 and PSM2 may operate in the power-saving mode. Here, the sizes of the first and second sub-transistors PSM1 and PSM2 may be less than the sizes of the first and second transistors M1 and M2, respectively. For example, when the first output current Iout1 is low, the first and second transistors M1 and M2 may be turned off and maintain a turn-off state by the first and second control signals G1 and G2. Also, the first and second sub-transistors PSM1 and PSM2 may be turned on and maintain a turn-on state by the first and second sub-control signals G11 and G22.

When a transistor is switched, some power loss may be caused by parasitic capacitance between the electrodes of the transistor. The parasitic capacitance generally increases with an increase in the size of the transistor, and the power loss amount may also increase with an increase in the parasitic capacitance. Accordingly, in the power-saving mode for power saving, the first and second sub-transistors PSM1 and PSM2 having a small size might be switched, whereby power consumption may be reduced.

For example, the first sub-transistor PSM1 may have a smaller size than the first transistor M1, as illustrated in FIG. 4. For example, the channel width and/or the channel length of the first sub-transistor PSM1 may be less than the channel width and/or the channel length of the first transistor M1. Also, the first transistor M1 and the first sub-transistor PSM1 may be n-channel metal oxide semiconductor (NMOS) transistors.

The second sub-transistor PSM2 may have a smaller size than the second transistor M2. For example, the channel width and/or the channel length of the second sub-transistor PSM2 may be less than the channel width and/or the channel length of the second transistor M2. Also, the second transistor M2 and the second sub-transistor PSM2 may be p-channel metal oxide semiconductor (PMOS) transistors.

For example, when used alone, the first and second transistors M1 and M2 may be used to pass a current up to about 600 mA or higher so as to cover up to a luminance of about 750 nit to 800 nit, but the first and second sub-transistors PSM1 and PSM2 may be used to pass a lower range of currents so as to cover a luminance about equal to or lower than about 100 nit. When used together, maximum luminance may be further increased.

In an embodiment, the normal mode is configured such that the first converter 110 outputs the first power voltage ELVDD through the CCM or first driving method using the first and second transistors M1 and M2, and the power-saving mode is configured such that the first converter 110 outputs the first power voltage ELVDD through the DCM or second driving method using the first and second sub-transistors PSM1 and PSM2.

The controller 140 may perform on/off control of the first transistor M1, the second transistor M2, the first sub-transistor PSM1, and/or the second sub-transistor PSM2. The first and second transistors M1 and M2 may be alternately turned on and off under the control of the controller 140. The first and second sub-transistors PSM1 and PSM2 may similarly be alternately turned on and off under the control of the controller 140 by using different control signals at their gate electrodes and/or by using complimentary technology such as NMOS and PMOS.

In an embodiment, the controller 140 may set different driving frequencies for the normal mode and the sub mode. For example, the controller 140 may control the transistors M1, M2, PSM1 and PSM2 with a driving frequency of about 1.5 MHz in the normal mode, and may control the same with a driving frequency of about 500 KHz in the power-saving mode.

For example, the controller 140 may generate a PWM signal having a predetermined frequency to control the driving frequencies of the respective control signals G1, G11, G2 and G22. The PWM signal may correspond to a square wave signal. The method of generating the PWM signal and adjusting the driving frequency may be performed using any of various techniques.

In an embodiment, a first driving frequency in the power-saving mode may be decreased to a preset value with a decrease in the magnitude of the load of the display panel. Accordingly, as the load of the display panel decreases, the number of switching operations of the first and second sub-transistors PSM1 and PSM2 may be decreased, whereby power loss caused by transistor switching may be reduced. Although the first converter 110 of FIG. 1 is illustrated in FIG. 3, the second converter 120 may be implemented either differently or similarly, so duplicate description may be omitted.

Figure 5A:
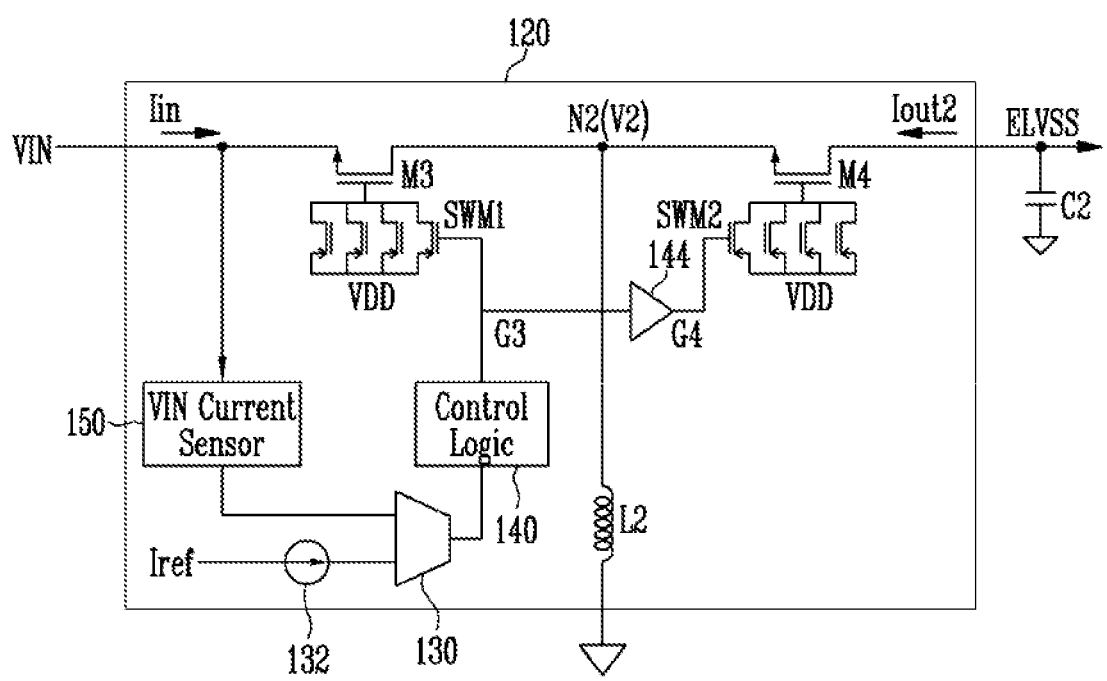
FIG. 5A is a schematic circuit diagram illustrating an example of the second converter included in the DC-DC converter of FIG. 1.
Figure 5B:
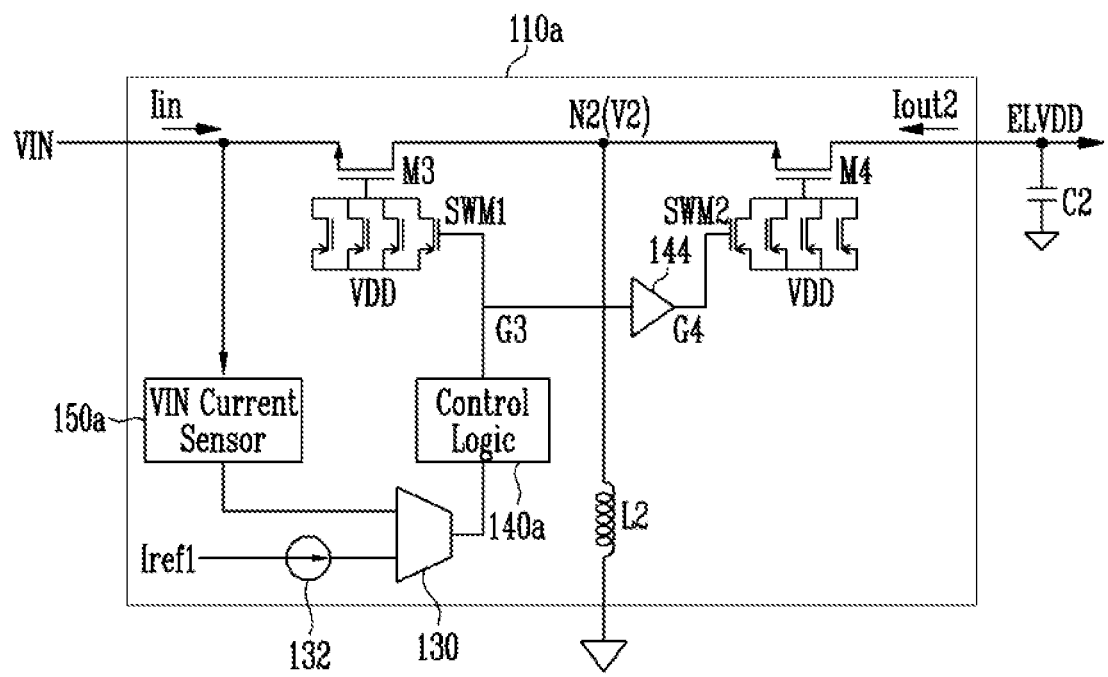
FIG. 5B is a schematic circuit diagram illustrating an example of the first converter included in the DC-DC converter of FIG. 1.
Figure 6A:
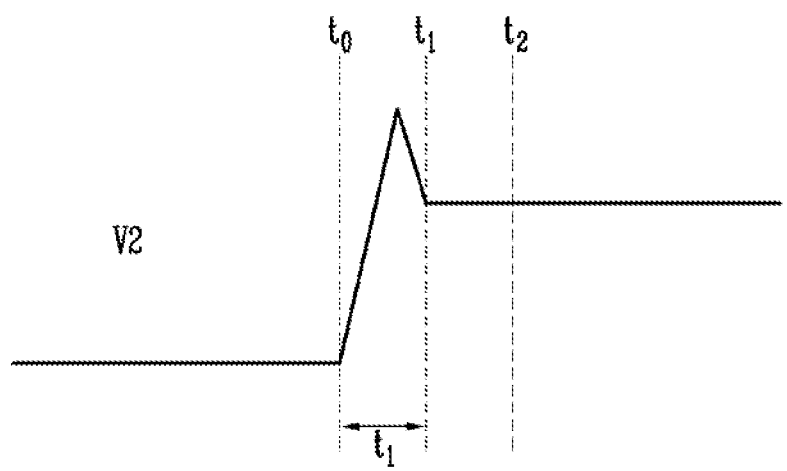
FIG. 6A is a graphical diagram explaining the slew rate of an inductor voltage in response to the number of switch transistors that are used according to an embodiment of the present disclosure.
Figure 6B:
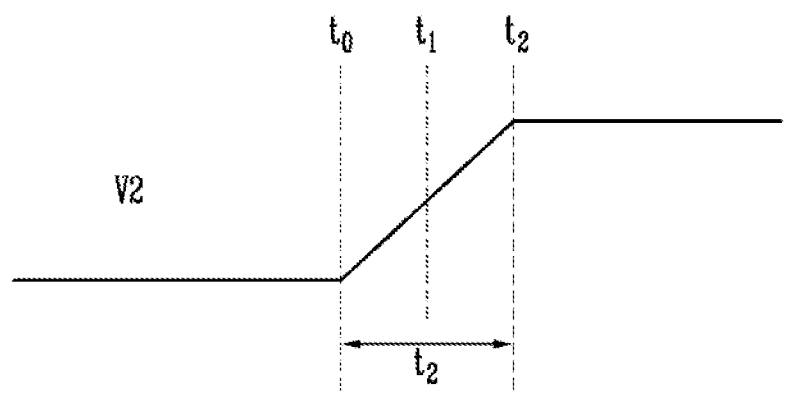
FIG. 6B is a graphical diagram explaining the slew rate of an inductor voltage in response to another number of switch transistors that are used according to an embodiment of the present disclosure.

FIG. 5A and FIG. 5B illustrate exemplary embodiments of the second and first converters, respectively, included in the DC-DC converter of FIG. 1. FIG. 6A and FIG. 6B are used for explaining the slew rate of an inductor voltage in response to the number of switch transistors that are used.

Referring to FIG. 1, FIG. 5A and FIGS. 6A and 6B, the second converter 120 may include an input current sensor 150, a switch, and a controller 140.

According to an embodiment of the present disclosure, the second converter 120 may convert a driving mode in response to the magnitude of the load of the display panel 300, such as based on the sum of grayscales forming a frame, the magnitude of a global current flowing from ELVDD to ELVSS, light emission luminance, and/or the like.

For example, the second converter 120 may be driven in a pulse skip mode (PSM) when the magnitude of the current load of the display panel 300 is determined, by a comparator 130, to be less than the magnitude of a reference current Iref, provided by a reference current source 132, based on the reference current Iref, and may be driven in a continuous conduction mode (CCM) or a discontinuous conduction mode (DCM) when the magnitude of the load of the display panel 300 is greater than that of the reference current Iref. The comparator 130 may continuously output either a logical binary "1" or a logical binary "0" any time a high or low current signal is applied to its sensed current input versus its reference current input, and may change quickly when the inputs are updated, without limitation. In a preferred embodiment, the comparator may be a latched comparator connected to the CON1 or like clock or control signal line from the timing controller 430 of FIG. 1, and may provide latched output at corresponding instances or intervals for higher accuracy and lower power consumption The latched comparator may employ positive feedback during a regeneration phase when a clock or control signal is high, and have a reset phase when the clock or control signal is low, for example.

Here, the reference current Iref may be previously set depending on the size of the display panel 300. For example, because the magnitude of the load of the display panel 300 may increase in proportion to the size of the display panel 300, the magnitude of the reference current Iref may be set so as to increase with an increase in the size of the display panel 300 for same type display panels.

Alternatively, the reference current Iref may be set depending on the ambient luminance of the environment, the time of day, or the like. For example, because the magnitude of the load of the display panel 300 may desirably increase in proportion to ambient luminance of the environment, the magnitude of the reference current Iref may be set so as to increase with an increase in the ambient luminance of the environment.

According to an embodiment, the controller 140 may sense an input current Iin through the input current sensor 150 when the second converter 120 is driven in the pulse skip mode (PSM). In the case of the pulse skip mode (PSM), because the amount of voltage consumed at a second output terminal is not large, the magnitude of the input current Iin may be relatively greater than that of a second output current Iout2. Accordingly, when the controller 140 outputs a second power voltage ELVSS by converting input power VIN based on the input current Iin, more precise conversion may be possible.

The switch may include a second inductor L2, a third transistor M3, a plurality of first switch transistors SWM1, a fourth transistor M4, and a plurality of second switch transistors SWM2.

The second converter 120 converts the input power VIN based on the input current Iin, sensed by the input current sensor 150, and on the reference current Iref, thereby outputting the second power voltage ELVSS.

The second inductor L2 may be coupled between a second node N2 and the ground. The second power voltage ELVSS may be controlled based on a second inductor current flowing through the second inductor L2.

The third transistor M3 may be coupled between the source of the input power VIN and the second node N2. The third transistor M3 may be turned on by receiving a third control signal G3 from the controller 140, and may perform control such that a current flows through the second inductor L2.

The fourth transistor M4 may be coupled between the second node N2 and the second output terminal. The fourth transistor M4 may be turned on alternately with the third transistor M3 in response to a fourth control signal G4 supplied from the controller 140. Here, all of the third transistor M3 and the fourth transistor M4 may be n-channel metal oxide semiconductor (NMOS) transistors. Also, the fourth control signal G4 may be the inversion signal of the third control signal G3, by traversing a signal inverter 144, but is not limited thereto. For example, there may be a brief overlap period where the third transistor M3 and the fourth transistor M4 are both turned on, depending on either inverter 144 properties, transistor SWM1, SWM2, M3, and/or M4 properties, and/or the signal G3 output from the controller 140. For example, the threshold voltages of SWM1 and SWM2 may be different from each other.

Accordingly, the fourth transistor M4 is turned on after electromotive force is generated in the second inductor L2 because the third transistor M3 is turned on, whereby the input power VIN may be converted into the second power voltage ELVSS and the second power voltage ELVSS may be output to the second output terminal. Here, one electrode of the third transistor M3, one electrode of the fourth transistor M4, and one electrode of the second inductor L2 may be coupled in common to the second node N2.

According to an embodiment of the present disclosure, the plurality of first switch transistors SWM1 may be arranged between the third transistor M3 and the controller 140, and may be coupled in parallel to the gate electrode of the third transistor M3. Also, the plurality of second switch transistors SWM2 may be arranged between the fourth transistor M4 and the controller 140, and may be coupled in parallel to the gate electrode of the fourth transistor M4. The plurality of first and second switch transistors SWM1 and SWM2 may be p-channel metal oxide semiconductor (PMOS) transistors. Although the case is illustrated in FIG. 5A in which the number of first and second switch transistors SWM1 and SWM2 is four each, the number of first and second switch transistors SWM1 and SWM2 may be variously changed without limitation thereto. When the input current Iin sensed by the input current sensor 150 is lower than the preset reference current Iref, the controller 140 turns on two or more of the plurality of first switch transistors SWM1, thereby coupling the gate electrode of the third transistor M3 to a first power source VDD.

Also, when the input current Iin sensed by the input current sensor 150 is lower than the preset reference current Iref, the controller 140 turns on two or more of the plurality of second switch transistors SWM2, thereby coupling the gate electrode of the fourth transistor M4 to the first power source VDD, without limitation. For example, in an alternate embodiment where the input current sensor further senses the output current Iout2, when the output current Iout2 is lower than another reference current, the controller 140 turns on two or more of the plurality of second switch transistors SWM2, thereby coupling the gate electrode of the fourth transistor M4 to the first power source VDD.

When two or more of the first switch transistors SWM1 are concurrently turned on or when two or more of the second switch transistors SWM2 are concurrently turned on, the slew rate of an inductor voltage V2 may rapidly increase, as illustrated in FIG. 6A. Here, the slew rate of the inductor voltage may be defined as the rate at which the inductor voltage V2 follows the gate control signal G3 or the third control signal. In other words, the slew rate may indicate the rate of change of the inductor voltage V2 per unit time.

When the slew rate of the inductor voltage V2 rapidly increases, Electro Magnetic Interference (EMI) may be caused, whereby a trembling phenomenon may be caused in the display panel 300 and/or communications may be affected.

However, when the input current Iin sensed by the input current sensor 150 is lower than the preset reference current Iref, the second converter 120 may be regarded as being driven in the pulse skip mode (PSM). In the pulse skip mode (PSM), there may be less effect of EMI, compared to the continuous conduction mode (CCM) or the discontinuous conduction mode (DCM). Accordingly, as illustrated in FIG. 6A, the time t1 taken for a current to start to flow in the second inductor L2 is made shorter than the time t2 taken for a current to start to flow in the second inductor L2 in FIG. 6B by increasing the slew rate of the inductor voltage V2, whereby it may decrease switching loss.

When the input current Iin sensed by the input current sensor 150 is higher than the preset reference current Iref, the controller 140 turns on one of the plurality of first switch transistors SWM1 through the third control signal G3, thereby decreasing the slew rate. Also, when the input current Iin sensed by the input current sensor 150 is higher than the preset reference current Iref, the controller 140 turns on one of the plurality of second switch transistors SWM2, thereby decreasing the slew rate.

In this case, as illustrated in FIG. 6B, the slew rate of the inductor voltage V2 may increase more slowly than the slew rate of the inductor voltage V2 illustrated in FIG. 6A. When the slew rate of the inductor voltage V2 increases more slowly, the probability that electromagnetic interference (EMI) is caused may be decreased.

That is, when the input current Iin sensed by the input current sensor 150 is higher than the preset reference current Iref, because the display panel 300 is regarded as being driven in the continuous conduction mode (CCM) or the discontinuous conduction mode (DCM), the effect of EMI may be greater than that in the pulse skip mode (PSM). Accordingly, as illustrated in FIG. 6B, the time t2 taken for a current to start to flow in the second inductor L2 is made longer than the time t1 taken for a current to start to flow in the second inductor L2 illustrated in FIG. 6A by decreasing the slew rate of the inductor voltage V2, whereby it may decrease the probability that EMI is caused.

According to an embodiment, when the sensed input current Iin is lower than the preset reference current Iref, as the sensed input current Iin is lower, more of the plurality of first switch transistors SWM1 may be turned on. Also, when the sensed input current Iin is lower than the preset reference current Iref, as the sensed input current Iin is lower, more of the plurality of second switch transistors SWM2 may be turned on. Accordingly, the slew rate may be effectively changed in response to the input current Iin.

As illustrated in FIG. 5B, the first converter 110a may be implemented similarly to the second converter 120, but may alternatively output the first power voltage ELVDD by converting the input power VIN based on the input current Iin sensed by the input current sensor 150a and on the reference current Iref1. Otherwise, the components included in the first converter 110a illustrated in FIG. 5B, and the operations thereof, are similar to those of the second converter 120 illustrated in FIG. 5A, and thus repeated description may be omitted.

Figure 7:
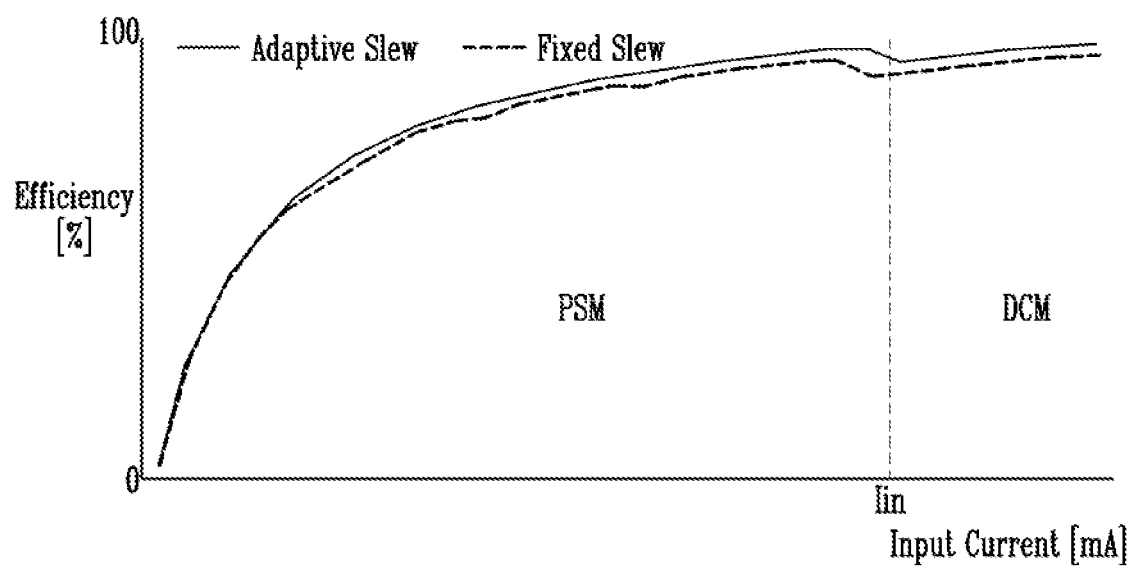
FIG. 7 is a comparative graphical diagram explaining effects obtainable when the slew rate of an inductor voltage is changed according to an embodiment of the present disclosure.

FIG. 7 illustrates the effect obtainable when the slew rate of an inductor voltage is changed based on adaptive slew of an exemplary embodiment versus fixed slew.

Referring to FIG. 7, it may be understood that the overall conversion efficiency is improved when the slew rate of the inductor voltage is changed, compared to when the slew rate of the inductor voltage is fixed. However, as described above, when the input current is lower than the reference current Iref, because the display panel 300 can be regarded as being driven in the pulse skip mode (PSM), there may be less effect of EMI. Accordingly, switching loss may be reduced by reducing the time during which a current flows through the second inductor L2. Also, when the input current is higher than the reference current Iref, because the display panel 300 can be regarded as being driven in the discontinuous conduction mode (DCM), the time during which a current flows through the second inductor L2 is increased, whereby it may decrease the probability that EMI is caused.

Figure 8A:
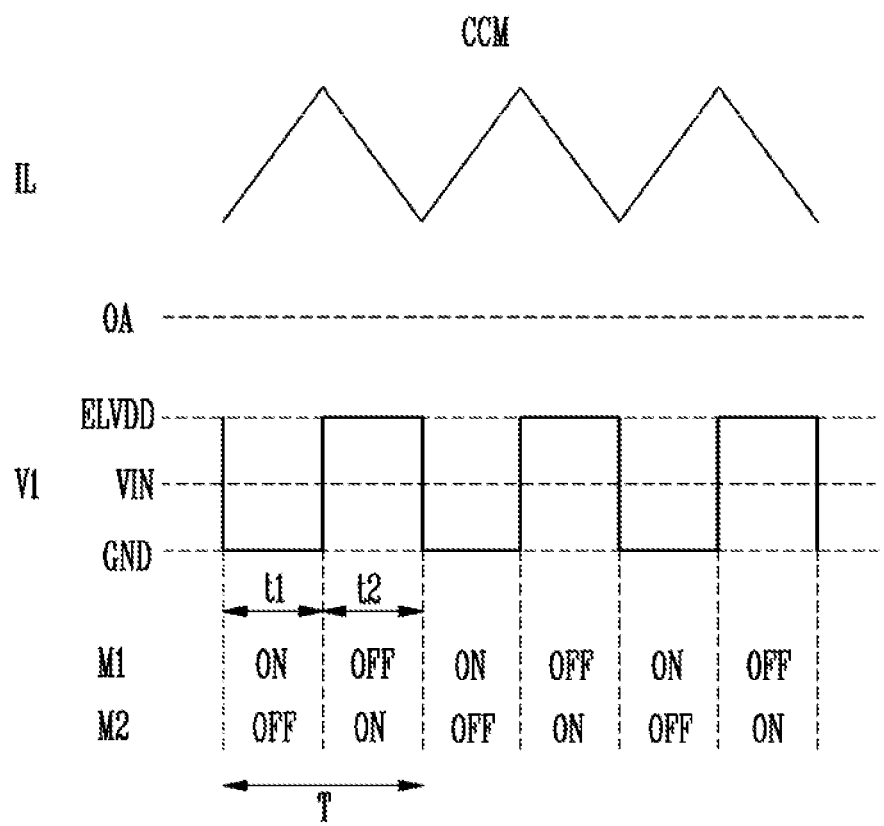
FIG. 8A is a hybrid signal diagram illustrating an example of a driving method in which the DC-DC converter of FIG. 1 generates an inductor current.
Figure 8B:
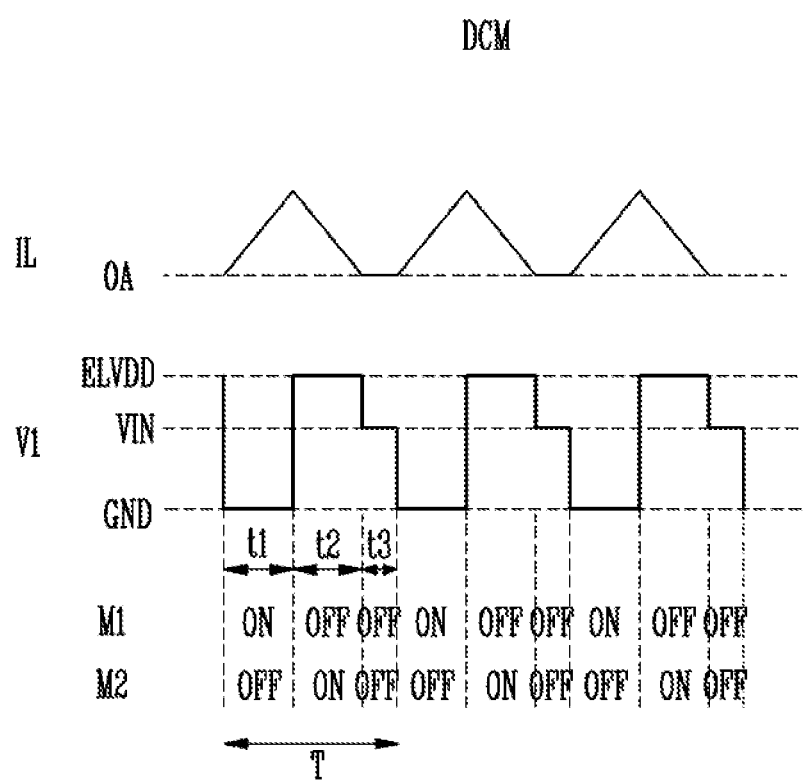
FIG. 8B is a hybrid signal diagram illustrating an example of a driving method in which the DC-DC converter of FIG. 1 generates an inductor current.
Figure 8C:
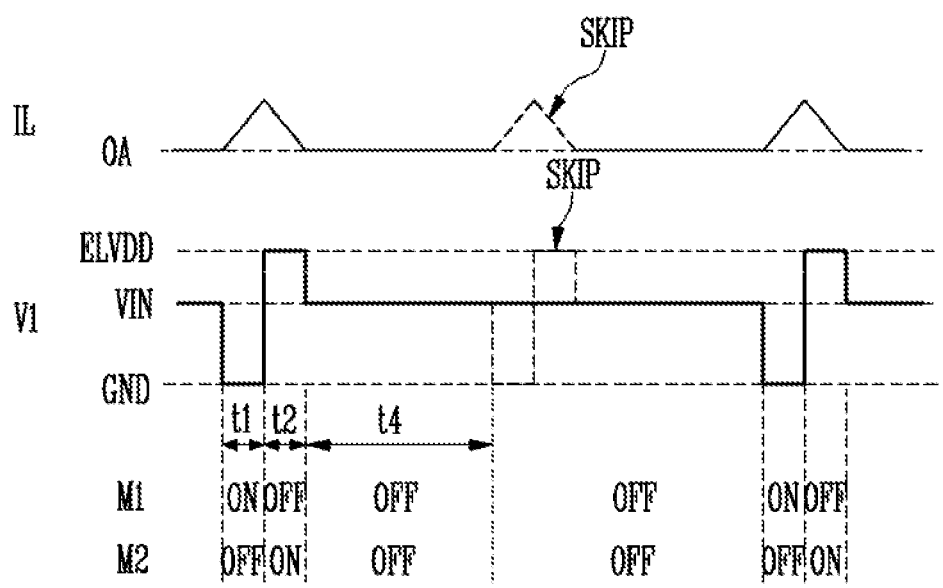
FIG. 8C is a hybrid signal diagram illustrating an example of a driving method in which the DC-DC converter of FIG. 1 generates an inductor current.

FIGS. 8A to 8C illustrate examples of driving methods in which the DC-DC converter of FIG. 1 generates an inductor current.

Referring to FIG. 1, FIG. 3, and FIGS. 8A to 8C, the first converter 110 may operate using a first driving method in a normal mode and operate using a second driving method in a power-saving mode, and the second converter 120 may operate using one of first to third driving methods in the normal mode and operate using the third driving method in the power-saving mode.

In FIGS. 8A to 8C, an embodiment in which the first converter 110 of FIG. 3 operates to output the first power voltage ELVDD using the first to third driving methods will be described. The second converter 120 may output the second power voltage ELVSS through the same or similar operation, so duplicate description may be omitted.

The first driving method may enable a first inductor current IL to be generated by alternately turning on the first and second transistors M1 and M2. As illustrated in FIG. 8A, the first and second transistors M1 and M2 may be repeatedly turned on and off at predetermined switching periods T, with M1 being substantially off while M2 is substantially on, and vice versa. For example, the turn-on state of the first transistor M1 and the turn-on state of the second transistor M2 need not overlap each other in the first period T.

When the first transistor M1 is turned on during a first continuous period t1, the voltage V1 of the first node has a ground level, and the magnitude of the first inductor current IL may increase due to the difference between the voltage of the input terminal and the voltage V1 of the first node.

When the first transistor M1 is turned off and the second transistor M2 is turned on during a second continuous period t2, the voltage V1 of the first node has the first power voltage level ELVDD by being increased, and the magnitude of the first inductor current IL may decrease towards substantially zero Amperes due to the difference between the voltage of the input terminal and the voltage V1 of the first node.

The switching period T, including the continuous periods t1 and t2 of FIG. 8A, is repeated, and the magnitude of the first inductor current IL may be continuously changed. For example, the first driving method may be a CCM driving method. The first driving method has high output stability because it minimizes an output ripple.

As illustrated in FIG. 8B, the second driving method is configured such that a switching period T further includes a time period in which the first and second transistors M1 and M2 are concurrently turned off during a first discontinuous period t3. Here, the voltage V1 of the first node may maintain the level of the input power VIN. Because one end of the first inductor L1 is open, the current maintains a substantially zero level, and the first inductor current IL does not substantially change during the first discontinuous period t3. Also, the amplitude of the first inductor current IL may be less than that in the first driving method. For example, the peak value of the first inductor current IL in the second driving method may be less than the peak value of the first inductor current IL in the first driving method. For example, the second driving method may be a DCM driving method.

The first converter 110 may adjust a driving frequency in the second driving method depending on the load of the display panel. Based on the same time, as the magnitude of the driving frequency decreases, the number of switching operations of the first and second transistors M1 and M2 (the number of turn-on events) may be decreased. Accordingly, power loss caused by parasitic capacitance depending on the number of switching operations of the first and second transistors M1 and M2 may be reduced.

As illustrated in FIG. 8C, the third driving method is configured such that a switching period alternatively includes a second discontinuous period t4 in which the first and second transistors M1 and M2 are concurrently turned off. The length of the second discontinuous period t4 may be greater than that of the first discontinuous period t3 of FIG. 8B. In an embodiment, the third driving method may skip some of switching periods. In this case, switching of the first and second transistors M1 and M2 is skipped, and the first inductor current IL may not flow. Accordingly, the amplitude of the first inductor current IL may be less than that in the second driving method. For example, the third driving method may be a PSM driving method.

Based on the same time, because the third driving method skips the switching operations of the first and second transistors M1 and M2 in a predetermined period, the total number of switching operations (the number of turn-on events) may be reduced. Accordingly, power loss caused by parasitic capacitance depending on the number of switching operations of the first and second transistors M1 and M2 may be reduced.

The operations of the second converter 120 may be the same or similar to the above-described operations, and thus repeated description may be omitted.

Hereinafter, other embodiments will be described. In the following embodiments, a description of configurations that are the same or similar to the above-described configurations may be simplified or omitted to avoid duplicate description, and description will be provided with a focus on differences.

Figure 9A:
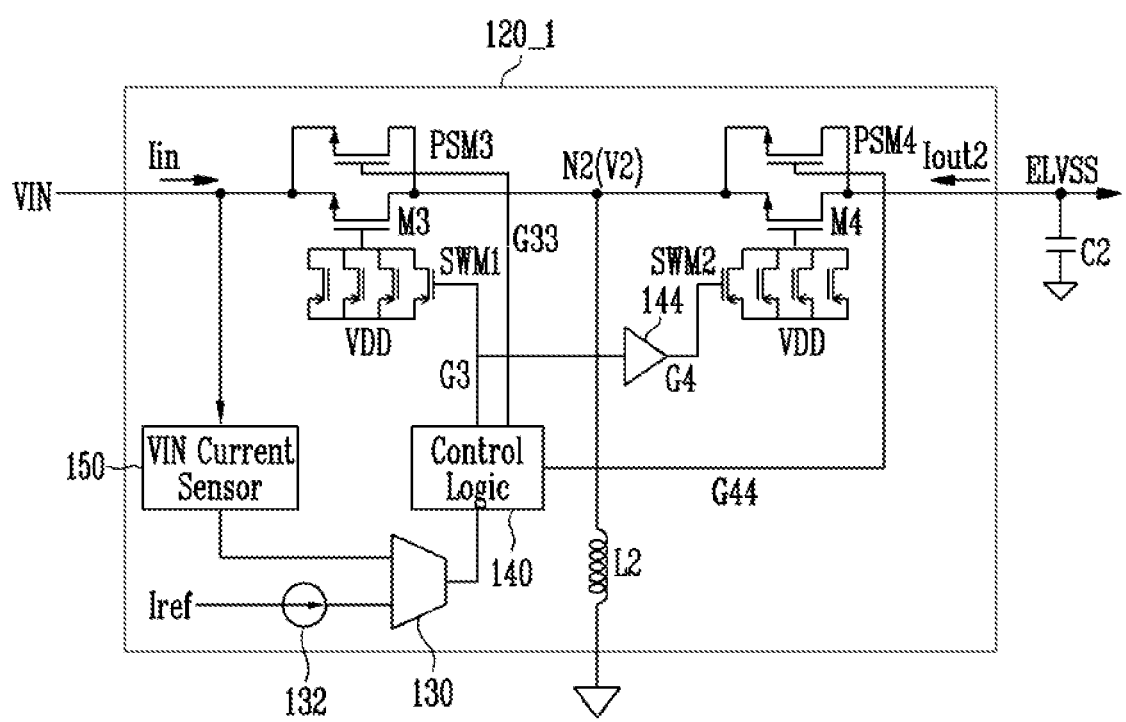
FIG. 9A is a schematic circuit diagram illustrating another example of the second converter included in the DC-DC converter of FIG. 1.
Figure 9B:
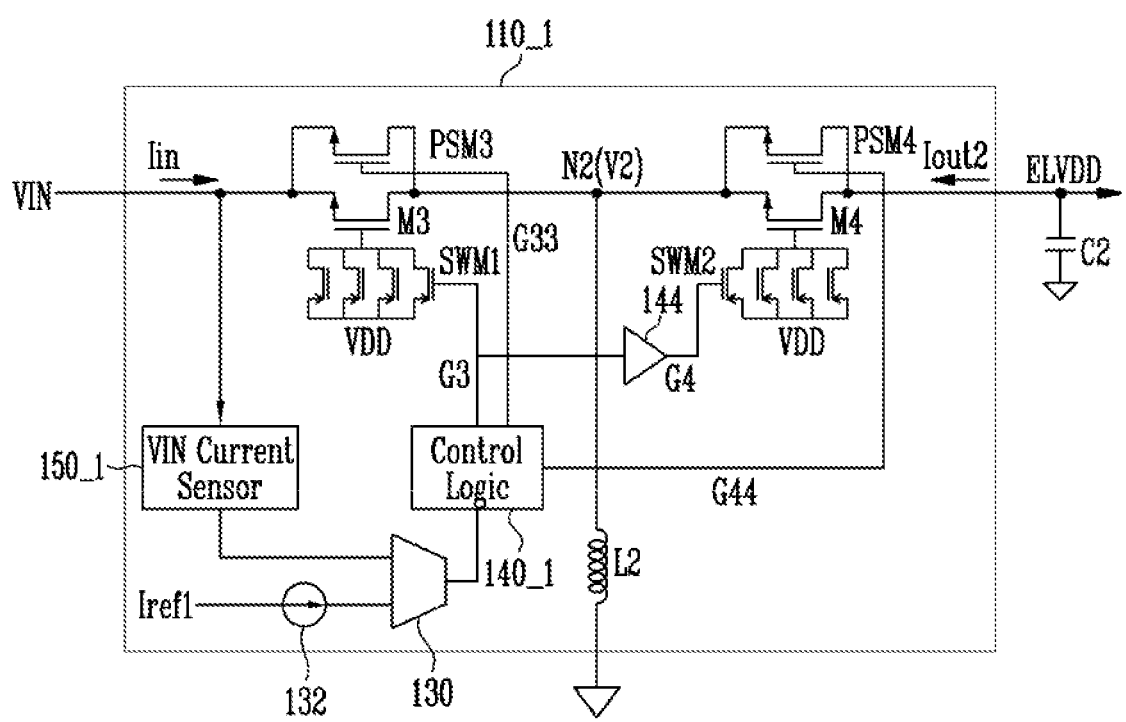
FIG. 9B is a schematic circuit diagram illustrating another example of the first converter included in the DC-DC converter of FIG. 1.

FIG. 9A and FIG. 9B illustrate other examples of the second and first converters included in the DC-DC converter of FIG. 1, respectively.

The embodiment illustrated in FIG. 9A is different from the embodiment illustrated in FIG. 5A in that the second converter 120_1 further includes a third sub-transistor PSM3 and a fourth sub-transistor PSM4. The second inductor L2, the third transistor M3, the fourth transistor M4, and the input current sensor 150, and the controller 140 illustrated in FIG. 9A are substantially the same as those described with reference to FIG. 5A, and thus a description thereof may be omitted.

The third sub-transistor PSM3 may be coupled to the third transistor M3 in parallel. The third sub-transistor PSM3 may be turned on by receiving a third sub-control signal G33 from the controller 140, and may perform control such that a current flows through the second inductor L2. The third sub-transistor PSM3 may perform the same operation as the third transistor M3.

The third sub-transistor PSM3 may have a smaller size than the third transistor M3. In this case, the rated current amount of the third sub-transistor PSM3 may be less than that of the third transistor M3. However, the size of the third sub-transistor PSM3 and the number of third sub-transistors PSM3 are not limited thereto. For example, the size of the third sub-transistor PSM3 may be the same as the size of the third transistor M3, and/or the number of third sub-transistors PSM3 may be variously changed.

The fourth sub-transistor PSM4 may be coupled to the fourth transistor M4 in parallel. The fourth sub-transistor PSM4 may be turned on by receiving a fourth sub-control signal G44 from the controller 140. The fourth sub-transistor PSM4 may be turned on alternately with the third sub-transistor PSM3. The fourth sub-transistor PSM4 may perform the same operation as the fourth transistor M4.

The fourth sub-transistor PSM4 may have a smaller size than the fourth transistor M4. However, the size of the fourth sub-transistor PSM4 and the number of fourth sub-transistors PSM4 are not limited thereto. For example, the size of the fourth sub-transistor PSM4 may be the same as the size of the fourth transistor M4, and/or the number of fourth sub-transistors PSM4 may be variously changed.

According to an embodiment of the present disclosure, when the second output current Iout2 increases, all of the third transistor M3 and the third sub-transistor PSM3 may be driven with reduced resistive losses, and all of the fourth transistor M4 and the fourth sub-transistor PSM4 may also be driven. Here, the sizes of the third and fourth sub-transistors PSM3 and PSM4 may be the same as the sizes of the third and fourth transistors M3 and M4, respectively. For example, when the second output current Iout2 increases, the third transistor M3 may be turned on by the third control signal G3, and the third sub-transistor PSM3 may be turned on by the third sub-control signal G33. Also, the fourth transistor M4 may be turned on by the fourth control signal G4, and the fourth sub-transistor PSM4 may be turned on by the fourth sub-control signal G44.

Also, when the second output current Iout2 is low, the third sub-transistor PSM3 and the fourth sub-transistor PSM4 are set to a turn-off state, and the third transistor M3 and the fourth transistor M4 may be driven. For example, when the second output current Iout2 is low, the third transistor M3 may be turned on by the third control signal G3, and the third sub-transistor PSM3 may be turned off by the third sub-control signal G33. Also, the fourth transistor M4 may be turned on by the fourth control signal G4, and the fourth sub-transistor PSM4 may be turned off by the fourth sub-control signal G44.

According to another embodiment of the present disclosure, the third and fourth transistors M3 and M4 operate to perform switching operations in a normal mode, and the third and fourth sub-transistors PSM3 and PSM4 may operate in a power-saving mode. Here, the sizes of the third and fourth sub-transistors PSM3 and PSM4 may be less than the sizes of the third and fourth transistors M3 and M4, respectively. For example, when the second output current Iout2 is low, the third and fourth transistors M3 and M4 may maintain a turn-off state by the third and fourth control signals G3 and G4. Also, the third and fourth sub-transistors PSM3 and PSM4 may maintain a turn-on state by the third and fourth sub-control signals G33 and G44.

When a transistor is switched, power loss may be caused by parasitic capacitance between the electrodes of the transistor. The parasitic capacitance increases with an increase in the size of the transistor, and the power loss amount may also increase with an increase in the parasitic capacitance. Accordingly, in the power-saving mode for power saving, the third and fourth sub-transistors PSM3 and PSM4 having a small size are switched, whereby power consumption may be reduced.

In an embodiment, the controller 140 may set different driving frequencies for the normal mode and the sub mode. For example, the controller 140 may control the transistors M3, M4, PSM3 and PSM4 with a driving frequency of about 1.5 MHz in the normal mode, and may control the same with a driving frequency of about 500 KHz in the power-saving mode.

For example, the controller 140 may generate a PWM signal having a predetermined frequency to control the driving frequencies of the respective control signals G3, G33, G4 and G44. The PWM signal may correspond to a square wave signal. The method of generating the PWM signal and adjusting the driving frequency may be performed using any of various techniques.

In an embodiment, the first driving frequency in the power-saving mode may be decreased to a preset value with a decrease in the magnitude of the load of the display panel. Accordingly, as the load of the display panel decreases, the number of switching operations of the third and fourth sub-transistors PSM3 and PSM4 may be reduced. Accordingly, power loss caused by transistor switching may be reduced.

As illustrated in FIG. 9B, the first converter 110_1 may output the first power voltage ELVDD by converting the input power VIN based on the input current Iin sensed by the input current sensor 150_1 and on the reference current Iref1. The components included in the second converter 110_1 including the second inductor L2, the third transistor M3, the fourth transistor M4, the input current sensor 150_1, and the controller 140_1 illustrated in FIG. 9B, and the operation thereof, may be substantially similar to those illustrated in FIG. 5B or FIG. 9A, and thus repeated description thereof may be omitted.

Figure 10:
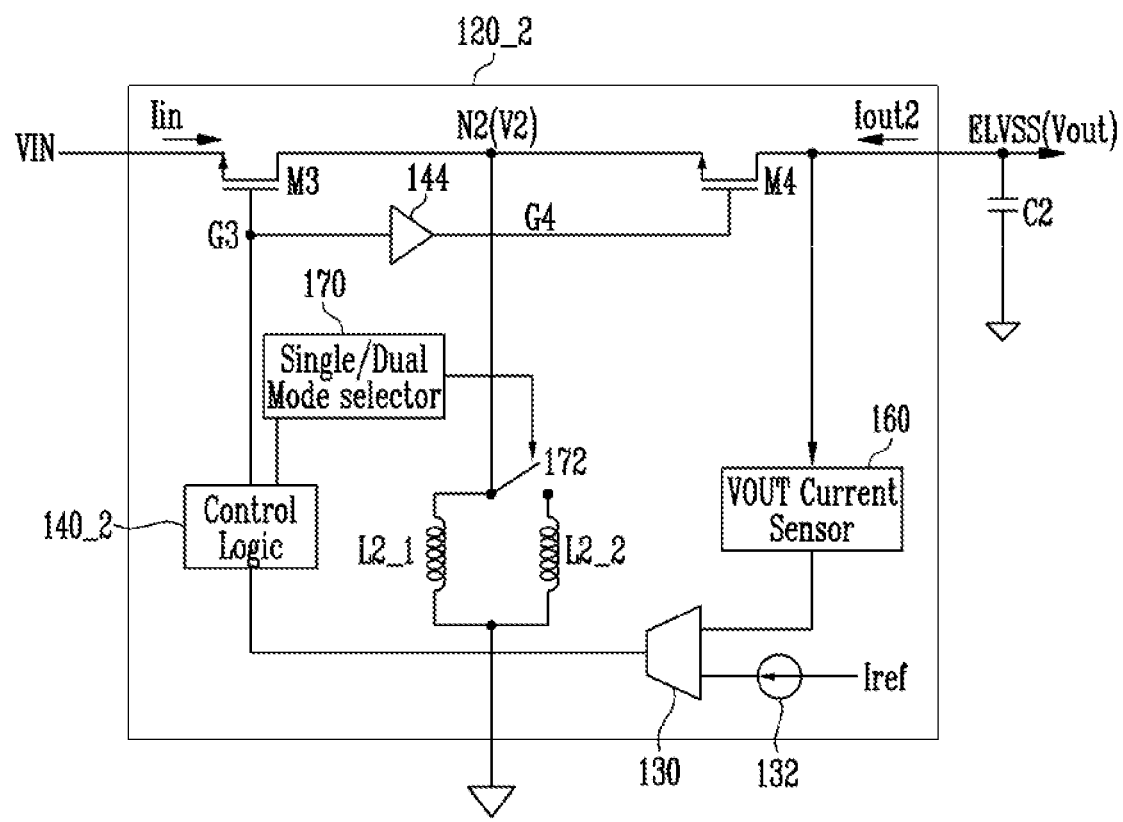
FIG. 10 is a schematic circuit diagram illustrating another example of the second converter included in the DC-DC converter of FIG. 1.
Figure 11A:
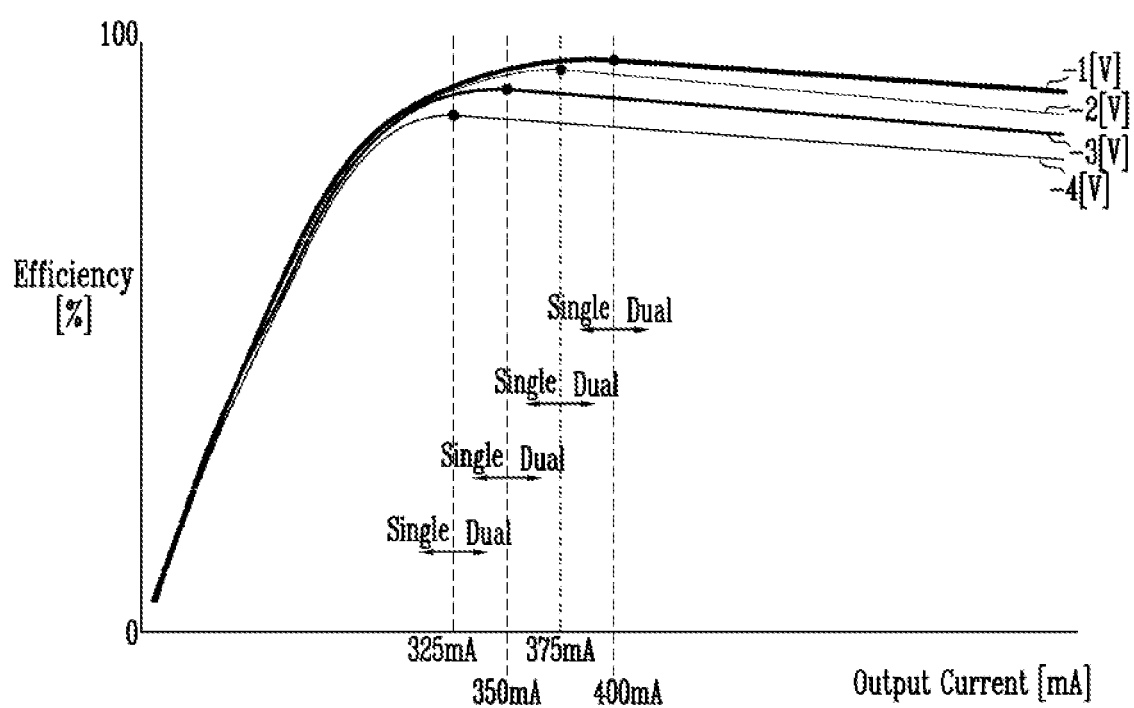
FIG. 11A is a comparative graphical diagram explaining the operation of the second converter of FIG. 10 in terms of the number of inductors activated.
Figure 11B:
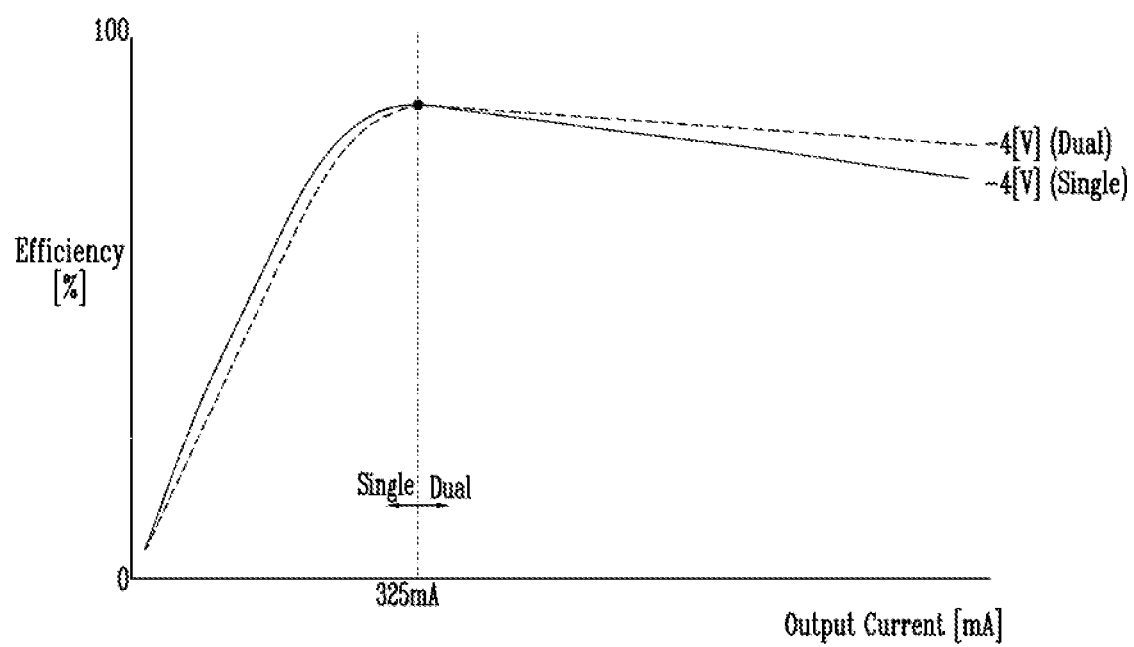
FIG. 11B is a comparative graphical diagram explaining the operation of the second converter of FIG. 10 in terms of the number of inductors activated.

FIG. 10 illustrates another example of the second converter included in the DC-DC converter of FIG. 1. FIG. 11A and FIG. 11B illustrate the operation of the second converter of FIG. 10.

Referring to FIG. 10, FIG. 11A and FIG. 11B, this exemplary embodiment is different from the exemplary embodiment illustrated in FIG. 5A in that a plurality of switching transistors need not be included, and a dual inductor and an output current sensor are further included.

Referring to FIG. 1 and FIG. 10, the second converter 120_2 may include an output voltage sensor, an output current sensor 160, a switch 172, and a controller 140_2. Duplicate description of elements described with respect to other exemplary embodiments may be omitted.

According to an embodiment of the present disclosure, the second converter 120_2 may change a driving mode in response to the magnitude of the load, such as but not limited to a light emission luminance of the display panel 300.

According to an embodiment of the present disclosure, the second converter 120_2 may sense an output voltage Vout through an output voltage sensor when the display panel 300 is driven in the above-described continuous conduction mode (CCM), or in the above-described discontinuous conduction mode (DCM).

The controller 140_2 may change the magnitude of a reference current Iref in response to the output voltage Vout sensed by the output voltage sensor. When the output voltage Vout is high, the magnitude of the reference current Iref may be set large.

The output voltage Vout of the second converter 120_2 may include first to fourth output voltages. The controller 140_2 may set a first reference current as the reference current Iref when the output voltage Vout of the second converter 120_2 is the first output voltage, set a second reference current as the reference current Iref when the output voltage Vout of the second converter is the second output voltage, set a third reference current as the reference current Iref when the output voltage Vout of the second converter is the third output voltage, and set a fourth reference current as the reference current Iref when the output voltage Vout of the second converter is the fourth output voltage. In this case, when the first output voltage is lower than the second output voltage, when the second output voltage is lower than the third output voltage, and when the third output voltage is lower than the fourth output voltage, the first reference current may be lower than the second reference current, the second reference current may be lower than the third reference current, and the third reference current may be lower than the fourth reference current.

For example, when the output voltage has the magnitude of −4[V], −3[V], −2[V] and −1[V], the reference current Iref may be 325 [mA], 350 [mA], 375 [mA] and 400 [mA], respectively, as illustrated in FIG. 11A. That is, as the negative output voltage is higher, the reference current Iref may be set higher. In other words, as the absolute value of the output voltage is greater, the reference current Iref may be set lower.

Here, referring to FIG. 11A and FIG. 11B, the respective curves illustrated in FIG. 11A represent adaptive efficiency curves. That is, in the period in which the output current Iout2 is higher than the reference current Iref based on the reference current Iref corresponding to the output voltage Vout, when the second converter is driven in a single mode, the efficiency becomes worse than when it is driven in a dual mode. Accordingly, it is desirable to drive the second converter in the single mode in the period in which the output current Iout2 is lower than the reference current Iref, and to drive the same in the dual mode in the period in which the output current Iout2 is higher than the reference current Iref.

Accordingly, the controller 140_2 may drive the second converter in the single mode in which a current flows only in a single inductor when the magnitude of the output current Iout2 sensed by the output current sensor 160 is less than the magnitude of the changed reference current Iref, and may drive the same in the dual mode in which a current flows through both of the two inductors when the magnitude of the output current Iout2 sensed by the output current sensor 160 is greater than the magnitude of the changed reference current Iref.

Referring again to FIG. 11B, the conversion efficiency for the output voltage of −4[V] is better in the single mode in the period in which the output current Iout2 is lower than the reference current Iref based on the reference current Iref of 325 [mA], but is better in the dual mode in the period in which the output current Iout2 is higher than the reference current Iref. That is, in the period in which the output current Iout2 is higher than the reference current Iref, when two inductors are used, a current is divided so as to flow in the respective inductors, whereby the power consumption may be reduced by half, compared to when a single inductor is used. However, when two inductors are used in the period in which the output current Iout2 is lower than the reference current Iref, more switching loss is caused than when a single inductor is used, so conversion efficiency may be reduced.

The switch may include two second inductors L2_1 and L2_2, a single/dual mode selector 170 for controlling coupling of the two second inductors L2_1 and L2_2, a third transistor M3, and a fourth transistor M4.

The second converter 120_2 converts the input power VIN based on the output current Iout2 sensed by the output current sensor 160 and on the reference current Iref changed in response to the output voltage Vout, thereby outputting the second power voltage ELVSS.

The two second inductors L2_1 and L2_2 may be coupled between a second node N2 and the ground. As described above, the controller 140_2 may drive the second converter in a single mode in which a current flows through only one second inductor L2_1 among the two second inductors L2_1 and L2_2 by turning off the switch through the single/dual mode selector 170 when the magnitude of the output current Iout2 sensed by the output current sensor 160 is less than the magnitude of the changed reference current Iref. Also, the controller 140_2 may drive the second converter in a dual mode in which a current flows through both of the two second inductors L2_1 and L2_2 by coupling the two inductors to each other in parallel by turning on the switch through the single/dual mode selector 170 when the magnitude of the output current Iout2 sensed by the output current sensor 160 is greater than the magnitude of the changed reference current Iref.

Based on the second inductor current flowing through the second inductors L2_1 and L2_2, the second power voltage ELVSS may be controlled.

The third transistor M3 may be coupled between the source of the input power VIN and the second node N2. The third transistor M3 may be turned on by receiving a third control signal G3 from the controller 140_2, and may perform control such that a current flows through the second inductor L2.

The fourth transistor M4 may be coupled between the second node N2 and a second output terminal. The fourth transistor M4 may be turned on alternately with the third transistor M3 in response to a fourth control signal G4 supplied from the controller 140_2. Here, all of the third transistor M3 and the fourth transistor M4 may be n-channel metal oxide semiconductor (NMOS) transistors. Also, the fourth control signal G4 may be the inversion signal of the third control signal G3, but is not limited thereto.

Accordingly, the fourth transistor M4 is turned on after electromotive force is generated in the second inductors L2_1 and/or L2_2 because the third transistor M3 is turned on, whereby the input power VIN may be converted into the second power voltage ELVSS and the second power voltage ELVSS may be output to the second output terminal. Here, the second node N2 may be defined as the node that is common to the third transistor M3, the fourth transistor M4, and at least the second inductor L2_1.

The second converter 120_2 may alternatively output the first power voltage ELVDD by converting the input power VIN based on the output current Iout2 sensed by the output current sensor 160 and based on the reference current Iref changed in response to the output voltage Vout.

In an alternate embodiment, at least a third inductor L2_3 may be switched into parallel configuration with the inductors L2_1 and L2_2, where the mode selector may switch the third inductor based on another reference current in comparison with an input current and/or output current similar to at least one such current previously described. Thus, duplicate description may be omitted.

Figure 12:
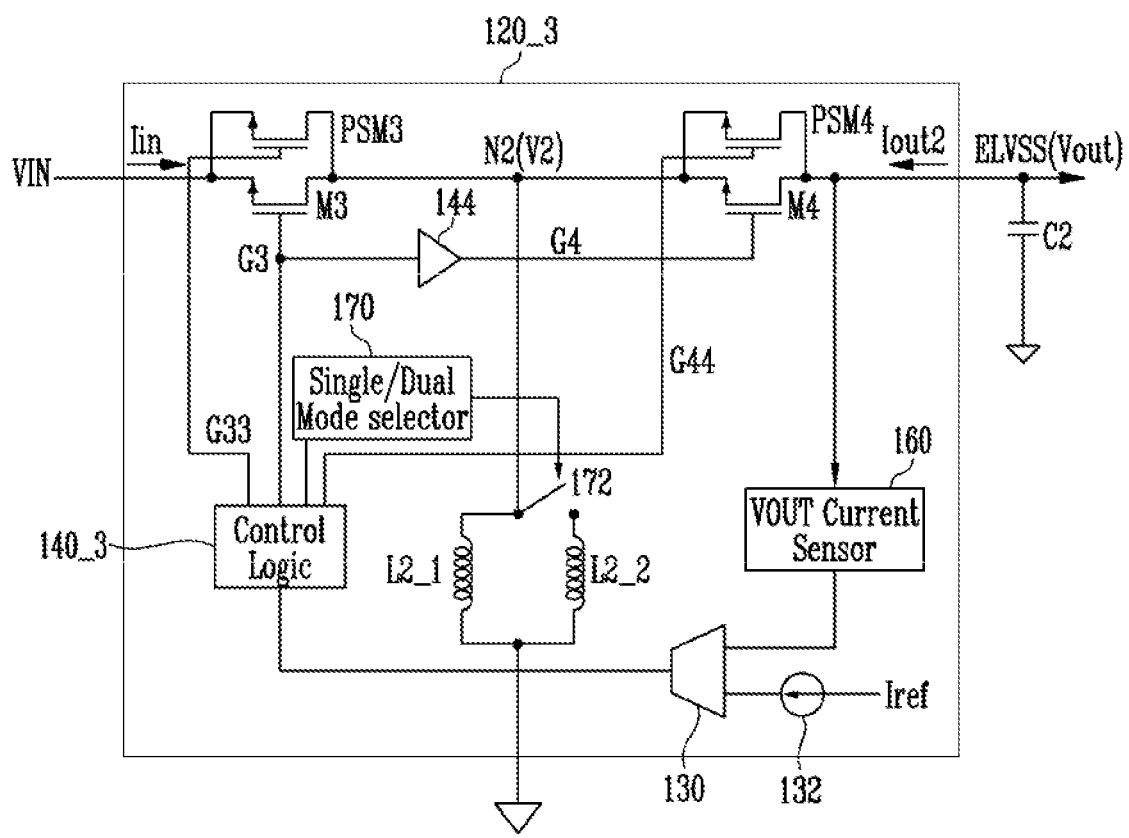
FIG. 12 is a schematic circuit diagram illustrating another example of the second converter included in the DC-DC converter of FIG. 1.

FIG. 12 illustrates another example of the second converter included in the DC-DC converter of FIG. 1.

The embodiment illustrated in FIG. 12 is different from the embodiment illustrated in FIG. 10 in that the second converter 120_3 further includes a third sub-transistor PSM3 and a fourth sub-transistor PSM4. The second inductors L2_1 and L2_2, the third transistor M3, the fourth transistor M4, the output current sensor 160, the single/dual mode selector 170, illustrated in FIG. 12 may be substantially the same as those described with reference to FIG. 10, and thus a description thereof may be omitted.

The third sub-transistor PSM3 may be coupled to the third transistor M3 in parallel. The third sub-transistor PSM3 may be turned on by receiving a third sub-control signal G33 from the controller 140_3, which is otherwise similar to the controller 140_2 of FIG. 10, and may perform control such that a current flows through the second inductors L2_1 and L2_2. The third sub-transistor PSM3 may perform substantially the same operation as the third transistor M3.

The third sub-transistor PSM3 may have a smaller size than the third transistor M3. In this case, the rated current amount of the third sub-transistor PSM3 may be less than that of the third transistor M3. However, the size of the third sub-transistor PSM3 and the number of third sub-transistors PSM3 are not limited thereto. For example, the size of the third sub-transistor PSM3 may be the same as the size of the third transistor M3, and the number of third sub-transistors PSM3 may be variously changed.

The fourth sub-transistor PSM4 may be coupled to the fourth transistor M4 in parallel. The fourth sub-transistor PSM4 may be turned on by receiving a fourth sub-control signal G44 from the controller 140_3. The fourth sub-transistor PSM4 may be turned on alternately with the third sub-transistor PSM3. The fourth sub-transistor PSM4 may perform the same operation as the fourth transistor M4.

The fourth sub-transistor PSM4 may have a smaller size than the fourth transistor M4. However, the size of the fourth sub-transistor PSM4 and the number of fourth sub-transistors PSM4 are not limited thereto. For example, the size of the fourth sub-transistor PSM4 may be same as the size of the fourth transistor M4, and the number of fourth sub-transistors PSM4 may be variously changed.

According to an embodiment of the present disclosure, when the second output current Iout2 increases, all of the third transistor M3 and the third sub-transistor PSM3 may be driven with reduced resistive losses, and all of the fourth transistor M4 and the fourth sub-transistor PSM4 may also be driven. Here, the sizes of the third and fourth sub-transistors PSM3 and PSM4 may be the same as the sizes of the third and fourth transistors M3 and M4, respectively. For example, when the second output current Iout2 increases, the third transistor M3 may be turned on by a third control signal G3, and the third sub-transistor PSM3 may be turned on by the third sub-control signal G33. Also, the fourth transistor M4 may be turned on by a fourth control signal G4, and the fourth sub-transistor PSM4 may be turned on by the fourth sub-control signal G44.

Also, when the second output current Iout2 is low, the third sub-transistor PSM3 and the fourth sub-transistor PSM4 are set to a turn-off state, and the third transistor M3 and the fourth transistor M4 may be driven. For example, when the second output current Iout2 is low, the third transistor M3 may be turned on by the third control signal G3 and the third sub-transistor PSM3 may be turned off by the third sub-control signal G33. Also, the fourth transistor M4 may be turned on by the fourth control signal G4 and the fourth sub-transistor PSM4 may be turned off by the fourth sub-control signal G44.

According to another embodiment of the present disclosure, the third and fourth transistors M3 and M4 operate to perform switching operations only in a normal mode, and the third and fourth sub-transistors PSM3 and PSM4 may operate only in a power-saving mode. Here, the sizes of the third and fourth sub-transistors PSM3 and PSM4 may be less than the sizes of the third and fourth transistor M3 and M4, respectively. For example, when the second output current Iout2 is low, the third and fourth transistors M3 and M4 may maintain a turn-off state by the third and fourth control signals G3 and G4. Also, the third and fourth sub-transistors PSM3 and PSM4 may maintain a turn-on state by the third and fourth sub-control signals G33 and G44.

When a transistor is switched, power loss is caused by parasitic capacitance between the electrodes of the transistor. The parasitic capacitance increases with an increase in the size of the transistor, and the power loss amount may also increase with an increase in the parasitic capacitance. Accordingly, in a power-saving mode for power saving, the third and fourth sub-transistors PSM3 and PSM4 having a small size are switched, whereby power consumption may be reduced.

In an embodiment, the controller 140_3 may set different driving frequencies for a normal mode and a sub mode. For example, the controller 140_3 may control the transistors M3, M4, PSM3 and PSM4 with a driving frequency of about 1.5 MHz in the normal mode, and may control the same with a driving frequency of about 500 KHz in the power-saving mode.

For example, the controller 140_3 may generate a PWM signal having a predetermined frequency to control the driving frequencies of the respective control signals G3, G33, G4 and G44. The PWM signal may correspond to a square wave signal. The method of generating the PWM signal and adjusting the driving frequency may be performed using any of various known methods.

In an embodiment, the first driving frequency in the power-saving mode may be decreased to a preset value as the magnitude of the load of the display panel decreases. Accordingly, as the load of the display panel decreases, the number of switching operations of the third and fourth sub-transistors PSM3 and PSM4 may be reduced. Therefore, power loss caused by transistor switching may be reduced.

The second converter 120_3 may alternatively output a first power voltage ELVDD by converting the input power VIN based on the output current Iout2 sensed by the output current sensor 160 and on the reference current Iref changed in response to the output voltage Vout. The components included in the second converter 120_3 and the operation thereof are the same as those illustrated in FIG. 12, and thus a repeated description will be omitted.

Through a DC-DC converter according to embodiments, the switching loss may be reduced by adaptively controlling the slew rate of an inductor voltage in response to the input current of the converter, whereby the DC-DC converter having improved conversion efficiency may be provided.

In an alternate embodiment, switch transistors as described with respect to FIGS. 5A, 5B, 9A, and/or 9B may be applied to the gate electrodes of transistors M3, M4, PSM3, and/or PSM4 of the controller 120_3 by control logic 140_3 based on a reference current in comparison with an input current and/or output current similar to at least one such current previously described. Thus, duplicate description may be omitted.

Through the DC-DC converter according to embodiments, a reference voltage may be changed depending on the output voltage of the converter, and the operations of a plurality of inductors are adaptively controlled in response to the changed reference voltage and the output current of the converter, whereby the DC-DC converter having improved conversion efficiency may be provided. Although the exemplary input and output voltages discussed herein may be substantially direct current (DC), it shall be understood that the present disclosure is not limited thereto. Alternate embodiments may receive as input, and/or provide as outputs, voltage signal levels that are not strictly DC, such as, for example, signals having an alternating current (AC) component.

Effects obtainable from various embodiments are not limited by the above-mentioned effects, and various effects are included in this description to introduce the spirit and potential thereof.

While exemplary embodiments of the present disclosure have been described in detail with reference to the accompanying drawings, it will be understood by those of ordinary skill in the pertinent art that embodiments of the present disclosure can be implemented in other specific forms without departing from the technical scope or spirit of the present disclosure. The forgoing embodiments are merely illustrative in all aspects and are not to be construed as limiting the present disclosure.

What is claimed is:

1. A DC-DC converter, comprising:
   a converter comprising an inductor and a plurality of transistors and configured to convert an input voltage into a power voltage and output the power voltage to an output terminal;
   a current sensor configured to sense an input current of the converter; and
   a controller configured to change a slew rate of an inductor voltage in response to the sensed current of the converter and a preset reference current,
   wherein the slew rate of the inductor voltage is a rate of change of the inductor voltage per unit time,
   wherein when the sensed current is higher than the preset reference current, the controller supplies a control signal to one of the of the plurality of transistors through at least one of a plurality of switch transistors, and
   wherein when the sensed current is lower than the preset reference current, the controller supplies the control signal to said one of the plurality of transistors through more switch transistors of the plurality of switch transistors than said at least one switch transistor.

2. The DC-DC converter according to claim 1, wherein the controller sets the slew rate of the inductor voltage as a reference slew rate when the sensed input current of the converter is higher than the preset reference current, and changes the slew rate of the inductor voltage to a slew rate higher than the reference slew rate when the input current of the converter is lower than the preset reference current.

3. The DC-DC converter according to claim 1, wherein the converter comprises:
   a first transistor coupled between an input terminal, to which the input voltage is applied, and a first node; and
   a second transistor coupled between the first node and the output terminal,
   wherein the inductor is coupled between the first node and ground.

4. The DC-DC converter according to claim 3, wherein the converter further comprises:
   a plurality of first switch transistors coupled in parallel to a gate electrode of the first transistor; and
   a plurality of second switch transistors coupled in parallel to a gate electrode of the second transistor.

5. The DC-DC converter according to claim 4, wherein:
   when the sensed input current of the converter is higher than the preset reference current, the controller supplies a first gate control signal to the gate electrode of the first transistor through one of the plurality of first switch transistors or a second gate control signal to the gate electrode of the second transistor through one of the plurality of second switch transistors, and
   when the sensed input current of the converter is lower than the preset reference current, the controller supplies the first gate control signal to the gate electrode of the first transistor through at least two of the plurality of first switch transistors or the second gate control signal to the gate electrode of the second transistor through at least two of the plurality of second switch transistors.

6. The DC-DC converter according to claim 3, wherein the controller alternately turns on the first transistor and the second transistor.

7. The DC-DC converter according to claim 1, further comprising:

another converter configured to convert the input voltage into another power voltage and output the other power voltage to another output terminal.

8. The DC-DC converter according to claim 7, wherein the other converter comprises:
a second inductor coupled between an input terminal to which the input voltage is applied and a second node;
a third transistor coupled between the second node and ground; and
a fourth transistor coupled between the second node and the other output terminal.

9. The DC-DC converter according to claim 7, wherein the power voltage is a negative voltage and the other power voltage is a positive voltage.

10. A DC-DC converter, comprising:
a converter comprising an inductor and a plurality of transistors and configured to convert an input voltage into a power voltage and output the power voltage to an output terminal; a first transistor coupled between an input terminal, to which the input voltage is applied, and a first node, wherein the inductor is coupled between the first node and ground; a second transistor coupled between the first node and the first output terminal; a plurality of first switch transistors coupled in parallel to a gate electrode of the first transistor; and a plurality of second switch transistors coupled in parallel to a gate electrode of the second transistor;
an input current sensor configured to sense an input current of the converter; and
a controller configured to change a slew rate of an inductor voltage in response to the input current of the converter and a preset reference current,
wherein the slew rate of the inductor voltage is a rate of change of the inductor voltage per unit time,
wherein when the sensed input current of the converter is higher than the preset reference current, the controller supplies a first gate control signal to the gate electrode of the first transistor through one of the plurality of first switch transistors or a second gate control signal to the gate electrode of the second transistor through one of the plurality of second switch transistors, and
wherein when the sensed input current of the converter is lower than the preset reference current, the controller supplies the first gate control signal to the gate electrode of the first transistor through at least two of the plurality of first switch transistors or the second gate control signal to the gate electrode of the second transistor through at least two of the plurality of second switch transistors.

* * * * *